US012281002B2

(12) United States Patent
Gebbink et al.

(10) Patent No.: US 12,281,002 B2
(45) Date of Patent: Apr. 22, 2025

(54) SEALING UNIT FOR A CONTAINER

(71) Applicant: SmartSeal AS, Stavanger (NO)

(72) Inventors: Jeroen Gerrit Anton Gebbink, Helmond (NL); Rune Kristian Knutsen, Stavanger (NO); John Minagawa-Webster, Loveland, OH (US)

(73) Assignee: SmartSeal AS, Stavanger (NO)

( * ) Notice: Subject to any disclaimer, the term of this patent is extended or adjusted under 35 U.S.C. 154(b) by 23 days.

(21) Appl. No.: 17/786,854

(22) PCT Filed: Dec. 17, 2020

(86) PCT No.: PCT/EP2020/086874
§ 371 (c)(1),
(2) Date: Jun. 17, 2022

(87) PCT Pub. No.: WO2021/123053
PCT Pub. Date: Jun. 24, 2021

(65) Prior Publication Data

US 2023/0035704 A1 Feb. 2, 2023

(30) Foreign Application Priority Data

Dec. 17, 2019 (NL) .................................... 2024486

(51) Int. Cl.
*B67D 1/04* (2006.01)
*B67D 1/08* (2006.01)

(52) U.S. Cl.
CPC ......... *B67D 1/0832* (2013.01); *B67D 1/0462* (2013.01); *B67D 2001/0828* (2013.01)

(58) Field of Classification Search
CPC ................ B67D 1/0832; B67D 1/0462; B67D 2001/0828
See application file for complete search history.

(56) References Cited

U.S. PATENT DOCUMENTS

2020/0087133 A1* 3/2020 Ye ........................ B67D 1/0437
2020/0307898 A1* 10/2020 Rhoades ............. B67D 1/0832
(Continued)

FOREIGN PATENT DOCUMENTS

JP 2018030639 A 3/2018
NL 7704708 10/1978
(Continued)

OTHER PUBLICATIONS

International Searching Authority at European Patent Office; International Search Report and Written Opinion for International Application No. PCT/EP2020/086874; mailed Oct. 1, 2021.

*Primary Examiner* — Jeremy Carroll
(74) *Attorney, Agent, or Firm* — McDonnell Boehnen Hulbert & Berghoff LLP

(57) ABSTRACT

The disclosure relates to a sealing unit for sealing a container wall opening. The sealing unit comprises inner and outer housings defining a gas flow passage arranged between an outer surface of the inner housing and an inner surface of the outer housing. The inner housing is movable in axial direction between a first axial position wherein the gas flow passage is closed and gas is prevented from flowing into or out of the container and a second axial position wherein the gas flow passage is open and gas is allowed to flow in a generally axial direction into or out of the container. The sealing unit also includes a biasing element arranged between the outer and inner housings and configured to urge the movable inner housing to move to the first axial position. A liquid flow passage including a liquid seal unit is defined inside the inner housing.

22 Claims, 26 Drawing Sheets

(56) References Cited

U.S. PATENT DOCUMENTS

| | | | | |
|---|---|---|---|---|
| 2022/0017273 | A1* | 1/2022 | Walton | B67D 1/0832 |
| 2022/0112023 | A1* | 4/2022 | Stockton | B67D 1/0847 |
| 2022/0332561 | A1* | 10/2022 | Miyatani | B67D 1/0832 |
| 2023/0166887 | A1* | 6/2023 | Miyatani | B67D 1/0802<br>222/567 |

FOREIGN PATENT DOCUMENTS

| | | | |
|---|---|---|---|
| WO | 99/15457 | A1 | 4/1999 |
| WO | 2004/063087 | A1 | 7/2004 |
| WO | 2011/006212 | A1 | 1/2011 |
| WO | WO-2017031584 | A1 * | 3/2017 |
| WO | 2019/012478 | A1 | 1/2019 |

* cited by examiner

SEALING UNIT FOR A CONTAINER

The present disclosure relates to a sealing unit for sealing an opening in a wall of a container for storing, transporting, and serving a liquid, for instance a beverage. The disclosure also relates to a bag connection element and/or a control unit, to be coupled in a removable manner to the sealing unit, to an assembly comprising such control unit and/or bag connection element and a sealing unit, and to a method of operating such sealing unit.

BACKGROUND

The present disclosure relates to a sealing unit for a liquid container configured to temporarily store an amount of liquid, such as beer. A liquid container such as a beer container may be made to withstand high internal pressures so as to make them suitable for holding a pressurized liquid. Such liquid containers are made of a structurally strong material and shape. For instance, a liquid container for holding beer can take the form of a beer keg or barrel made of stainless steel or aluminum. A beer keg may have a single opening at one end. The sealing unit generally is made of steel and is firmly mounted to the wall of the container. A tubular element or a spear may be attached to the sealing unit extending from the side of the opening of the container to the opposite side thereof. The sealing unit may have a self-closing valve that is opened by a coupling fitting which may be attached to the sealing unit when the keg is tapped or when the keg is filled. There may also be means for allowing gas (usually carbon dioxide) to enter or leave the container in order to drive the beer out of the keg when the keg is tapped or to allow beer to enter when the keg is filled. The coupling fitting may have one or two valves that control the flow of beer out of and gas into the keg.

Sealing units for containers tend to have a complex structure with a large number of different components and usually are primarily made of metal parts. This may make such sealing units expensive, heavy and/or bulky.

OVERVIEW

It is an object of the present disclosure to provide an improved sealing unit.

It is a further object to provide a sealing unit that is at least one of easy to manufacture, light-weight, suitable for the high pressures prevailing in pressurized containers, and has a relatively small number of individual components.

At least one of these objects may be at least partially achieved in a sealing unit for sealing an opening in a wall of a container for storing, transporting, and serving a liquid, for instance a beverage, the sealing unit comprising:

- an outer housing configured to be fixedly attached to the container wall;
- an inner housing arranged inside the outer housing and configured to be axially movable relative to the outer housing;
- wherein the outer and inner housing are configured to define a gas flow passage arranged between an outer surface of the inner housing and an inner surface of the outer housing and wherein the inner housing is movable in axial direction between a first axial position wherein the gas flow passage is closed and gas is prevented from flowing into the container or out of the container and a second axial position wherein the gas flow passage is open and gas is allowed to flow in a generally axial direction into the container or out of the container, further comprising a biasing element arranged between the outer housing and inner housing and configured to urge the movable inner housing to move to the first axial position;
- wherein inside the movable inner housing a liquid flow passage is defined, wherein the inside the liquid flow passage a liquid seal unit is arranged, the liquid seal unit comprising:
  - a base fixedly attached to or integrally formed with the movable inner housing and including a tubular base element; and
  - a valve including a tubular valve element arranged to be axially movable inside the tubular base element, wherein the tubular valve element is configured to be movable inside the tubular base element between a closed position wherein the liquid flow passage is closed and liquid is prevented from flowing into or out of the container, and an open position wherein the liquid flow passage is open and liquid is allowed to flow in a generally axial direction into the container or out of the container.

The sealing unit comprising such valve and base may be configured to not only allow the liquid passage through the sealing unit to be closed or opened (for instance depending on the position of (a part of) the valve), but also allow the gas passage through the sealing unit to be closed or opened (for instance depending on the position of the inner housing relative to the outer housing). Furthermore, in absence of an external force on the inner housing or if the external force is below a threshold determined by the biasing element, the gas passage is closed automatically under the influence of this biasing element. Optionally (as will be described later), in absence of an external force on the valve or if this external force is below a threshold determined by a further biasing element, the liquid passage is closed automatically under the influence of the further biasing element. The first biasing element may be a spring element, for instance a helical spring, between the inner and outer housing, that is configured to urging the inner and outer housing to move to the closed position when the housings are in the open position. Similarly, in certain embodiments, the further biasing element may be an elastic or resilient part of the valve, configured to cause the valve to move back to the closed position.

In an embodiment the biasing element is configured to allow the inner housing to be moved from the first axial position to the second axial position under the influence of a first external force while forcing the inner housing to move from the second axial position to the first axial position when the first external force is reduced or removed.

In an embodiment the sealing unit comprises a further biasing element configured to urge the movable tubular valve element to move to the closed position. The further biasing element may comprise a flexible connection element (wherein the flexible connection element may at least partially be made of elastic material) configured to allow the tubular movable valve element to be moved from the closed position to the open position under the influence of a second external force while forcing the tubular movable valve element to return from the open position to the closed position when the second external force is reduced or removed.

In an embodiment both the outer housing and inner housing are at least one of cylindrically shaped, concentrically arranged and together forming a telescopic tube.

In embodiments of the present disclosure at least one of the outer housing, the inner housing and liquid seal unit are made of plastic.

In an embodiment the base of the liquid seal unit is at least partially made of plastic material having a larger flexibility than the other parts of the liquid seal unit.

In an embodiment the sealing device is configured to allow axial movement of the valve of the liquid seal unit relative to the inner housing independently from the axial movement of the inner housing relative to the outer housing.

In an embodiment the interspace between the outer and inner housing defining the gas flow passage has a generally annular shape and/or wherein the liquid flow passage has a generally cylindrical shape.

In further embodiments the valve comprises a valve connection element including a sealing extension extending onto a radial flange of the inner housing for forming a seal between the radial flange of the inner housing and a corresponding radial flange of the outer housing. The valve that together with the base forms the liquid seal unit therefore not only is able to close or open the liquid passage through the sealing unit (depending on the position of (a part of) the valve), but also to close or open the gas passage through the sealing unit (depending on the position of the inner housing relative to the outer housing). The liquid seal unit therefore is in these embodiments a unit that is capable of doing more than sealing the passage of liquid since it can seal the passage of gas as well.

The container may of a type comprising a collapsible, thin-walled liquid bag made of flexible material arranged in the interior of its container. In general such collapsible bag may be attached to the sealing unit and be arranged in fluid connection with the sealing unit. The interior of the collapsible bag may then be used to store therein the liquid, while gas can be added to or removed from the interspace between the walls of the container and the collapsible bag through the same sealing unit as well. For instance, by increasing the pressure inside the interspace (for instance by allowing (driving) gas to enter the interspace through the sealing unit), the liquid inside the bag is urged to be discharged from the bag through the sealing unit. In order to establish a fluid (liquid and/or gas) connection between the sealing unit and the interior of the collapsible bag the inner housing of the sealing unit may comprise a tubular end part configured to receive a bag connection element.

According to an aspect of the present disclosure a bag connection element for a sealing device as defined herein is provided. The bag connection element may be attached to or form part of the collapsible bag and is configured to enable proper attachment of the bag the sealing unit, while at the same time allowing a liquid connection or passage between the interior of the bag and the interior of the inner housing and a gas connection or passage between the a first interspace between the container wall and collapsible bag and second interspace between the inner and outer housings.

Furthermore, the bag connection element may be configured to allow attachment of a tubular element, for instance a down pipe or spear, that provides a liquid passage from the sealing unit/bag connection element at one side of the collapsible bag to the inflow/outflow opening at the opposite site of the bag. Especially in case of attachment of a relatively long tubular element it may be difficult to maintain in use a correct alignment of the tubular element and the tubular end part of the inner housing. In order to keep the tubular element and the tubular end part of the inner housing properly aligned, the bag connection element may comprise a tubular upper portion that can be inserted in a fitting manner into the tubular end part of the inner housing. Preferably the tubular upper portion comprises one or more attachment elements configured to allow attachment to the inner surface of the tubular end part. Furthermore the outer surface of the tubular upper portion may comprise radial protrusions, for instance a number of parallel ring-shaped ribs, allowing the bag connection element to be snap-fitted to radial protrusions provided at the inner surface of the tubular end part of the inner housing. In order to further increase the likelihood of a proper alignment the bag connection element may comprise one or more support elements, each defining a receiving space configured to receive the tubular end part of the inner housing when the bag connection element is inserted into the tubular end part. The number of support elements may vary. However, the number of support elements is preferably at least three and each of the support elements preferably extends in radial direction relative to the centerline of the tubular end part of the inner housing. In these embodiments- and in embodiments wherein the support elements alternatively or additionally are evenly distributed along the circumference of a tubular upper portion—the risk of the bag connection element and perhaps the tubular element (i.e. the down pipe) becoming misaligned with respect to the sealing device is reduced. Furthermore the receiving space may have a width corresponding to the thickness of the tubular end part of the inner housing so that the end part can be firmly held by the support element.

In particular preferred embodiments the bag connection element is a spout, for instance a spout made of plastic material, comprising a radial attachment flange connected to a pouch forming the collapsible bag. In this case a spouted pouch may form the collapsible bag.

According to another aspect a control unit for controlling a gas flow and a liquid flow into or out of a container for storing, transporting, and serving a liquid, for instance a beverage, is provided, the control unit being configured to be coupled in a removable manner to a sealing unit as defined herein, the control unit optionally comprising a control unit housing comprising a coupling fitting for removably coupling the control unit housing to a corresponding coupling fitting of a sealing unit.

In an embodiment the control unit housing is internally provided with a number of passages for allowing passage of driving gas and liquid and/or wherein the control unit housing comprises a first inner tube with a relatively small diameter and a second outer tube, arranged concentrically around the first inner tube and having a larger diameter, the inner tube and outer tube being able to move telescopically relative to each other to exert an external axial force the inner housing and valve when the control unit is mounted to the sealing unit.

According to another aspect an assembly is provided comprising a container for storing, transporting, and serving a liquid, for instance a beverage, the container comprising a wall having an opening in which a sealing unit as defined herein is mounted, the container comprising a collapsible, thin-walled liquid bag made of flexible material arranged in the interior of the container, wherein the collapsible bag is preferably configured to allow a beverage to be arranged in its interior while in the interspace between the walls of the container and the collapsible bag a driving gas can be arranged.

The container and/or the control unit may be made of steel or aluminum and/or the container may be generally cylindrical. In a further embodiment the container is a beer keg.

The present disclosure also relates to the use of the sealing unit and/or assembly as defined herein.

According to another aspect a method of operating a sealing unit as defined herein is provided, the method comprising:

exerting a first external axial force on the inner housing so as to move the inner housing from the first axial position to the second axial position;

supplying gas through the gas flow passage into the container, optionally into the interspace between the container wall and a collapsible bag arranged inside the container, or removing gas from the container through the gas flow passage;

exerting a second external force on the tubular valve element so as to move the tubular valve element from the closed position to the open position;

supplying liquid through the liquid flow passage into the container, optionally into the interior of a collapsible bag arranged inside the container, or removing liquid from the container through the liquid flow passage;

reducing or removing the external forces on the inner housing and tubular valve element causing the inner housing and the tubular valve element to move the inner housing to the first position and the tubular valve element to the closed position.

BRIEF DESCRIPTION OF THE DRAWINGS

The present disclosure will be described with respect to particular embodiments and with reference to certain figures but the disclosure is not limited thereto. The figures described are only schematic and are not intended to be limiting. In the drawings, the size of some of the elements may be exaggerated and not drawn on scale for illustrative purposes. The dimensions and the relative dimensions do not necessarily correspond to actual reductions to practice of the disclosure.

FIGS. 2, 3, 4, and 5A are partly cut-away side views of the embodiment of FIG. 1;

FIG. 5B is a cross-section of the first embodiment of the sealing unit and portions of the control unit and container, in a position with a closed liquid seal and a closed gas seal;

FIGS. 6, 7A, 8, 9A, 10, 11, and 12 are side views (partly cut-away) showing respective steps in the filling stage;

FIG. 7B is a cross-section of the first embodiment of the sealing unit and portions of the control unit and container, in a position with a closed liquid seal and an open gas seal;

FIG. 9B is a cross-section of the first embodiment of the sealing unit and portions of the control unit and container, in a position of with an open liquid seal and an open gas seal;

FIGS. 14B and 14C are more schematic cross-sections of a liquid sealing unit similar to the liquid sealing units of FIGS. 1-13C, wherein FIG. 14B shows a closed position and FIG. 14C shows an open position;

FIGS. 18, 19, 20, 21, 22, 23, 24, 25, 25A, 26, 27A, 27B, and 27C show a third embodiment of a sealing unit and a control unit, in which:

FIGS. 18 and 19 are views of the liquid seal unit 165, FIGS. 20 and 21 views of the outer housing, and FIGS. 22, 23, and 24 show views of the inner housing of the third embodiment;

FIG. 25 is a cut-away view of the outer housing of the sealing unit, while FIG. 25A shows a magnified detail of FIG. 25;

FIG. 26 is a view of the sealing unit in assembled state; and

FIGS. 27A, 27B, and 27C show the sealing in different stages of operation, respectively in a first stage wherein both the liquid and gas seals are closed, in a second stage wherein the liquid seal is still sealed and the gas seal starts to be opened, and in a third stage wherein both the liquid seal and gas seal are opened.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present disclosure.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
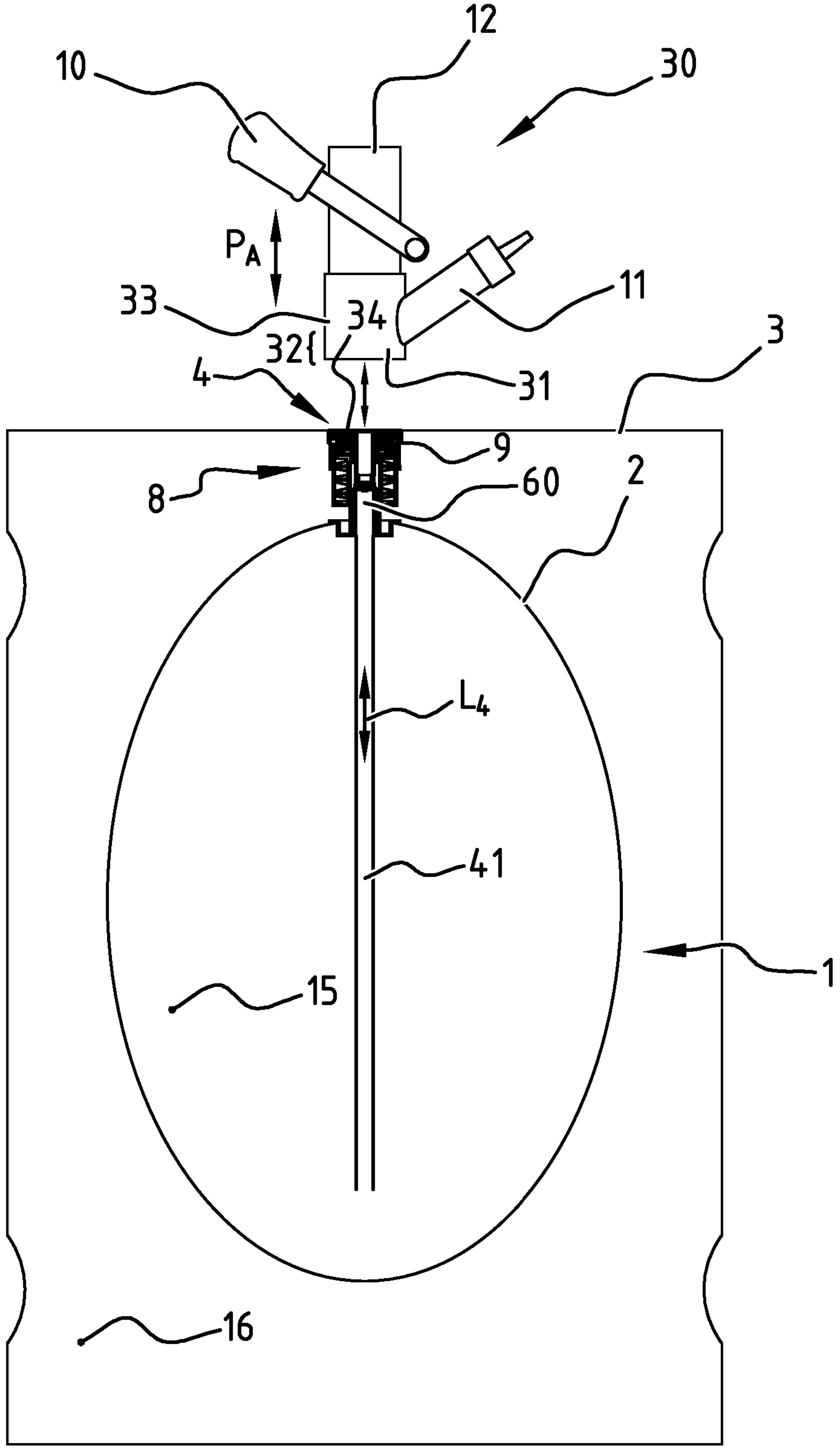
FIG. 1 shows schematic cross-section of a beverage container, a first embodiment of the sealing unit and an embodiment of the control unit.
Figure 2:
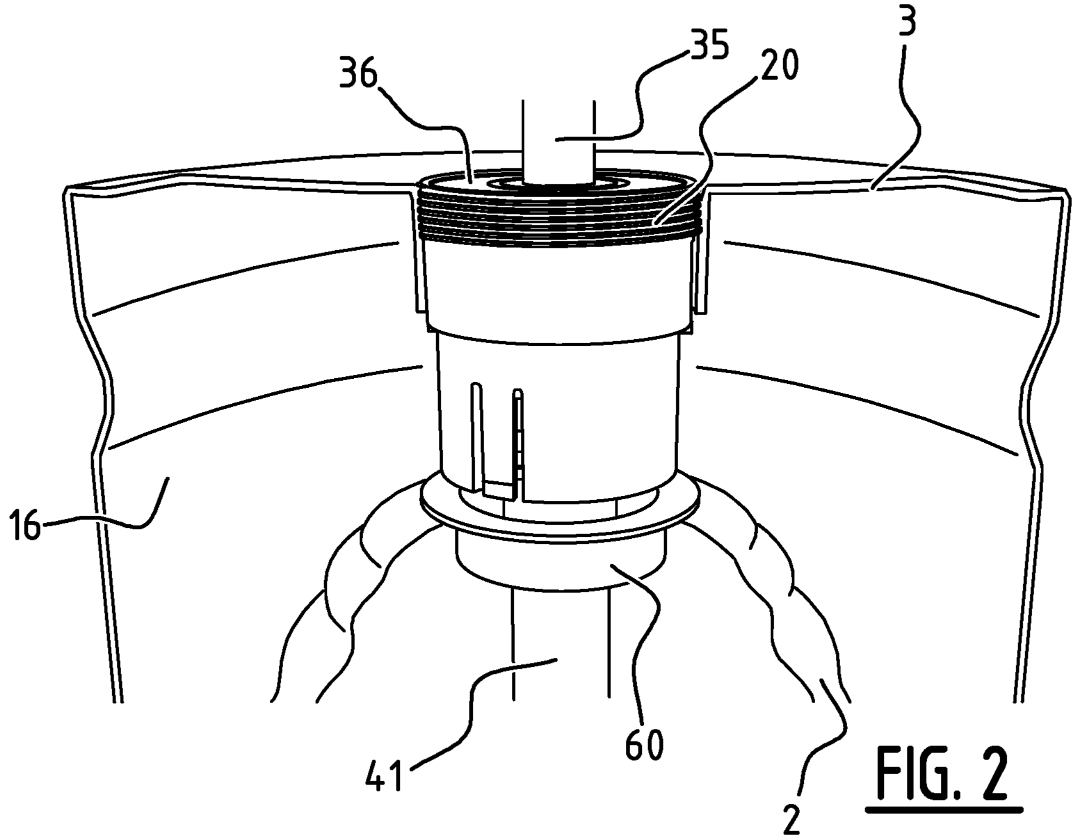
FIGS. 2, 3, 4, 5A, 5B, 6, 7A, 7B, 8, 9A, 9B, 10, 11, and 12 are further representations of the first embodiment of (at least) the sealing unit and show.
Figure 3:
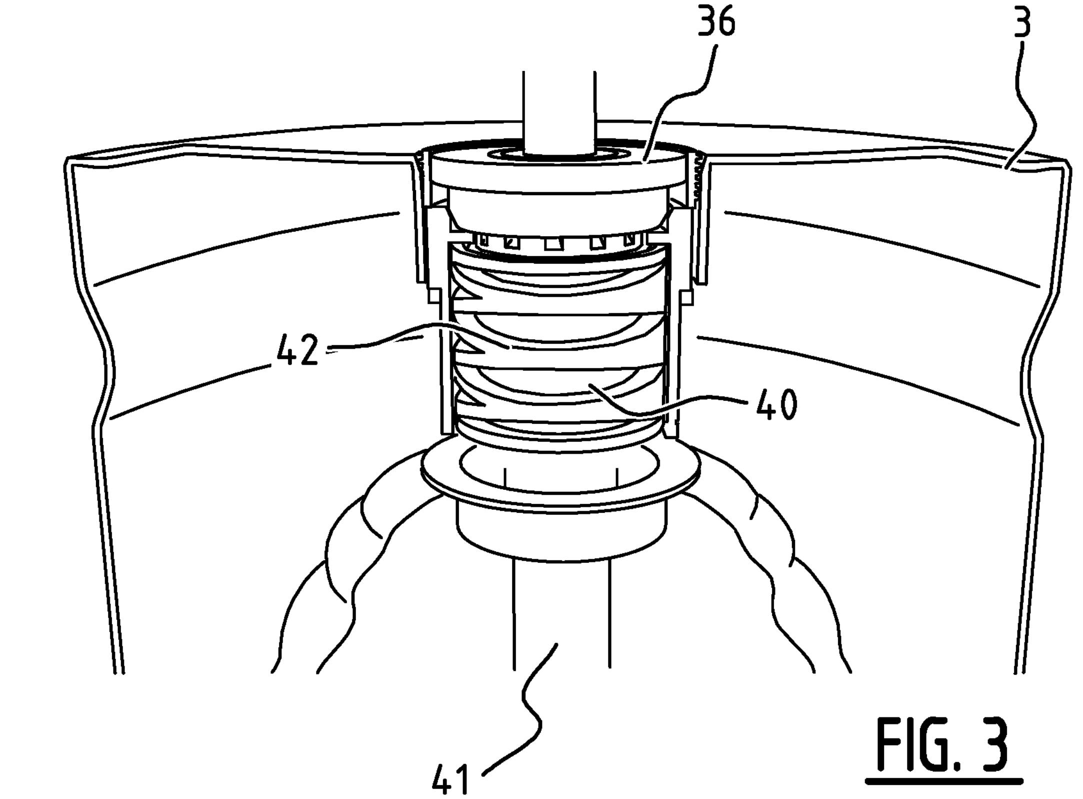
Figure 4:
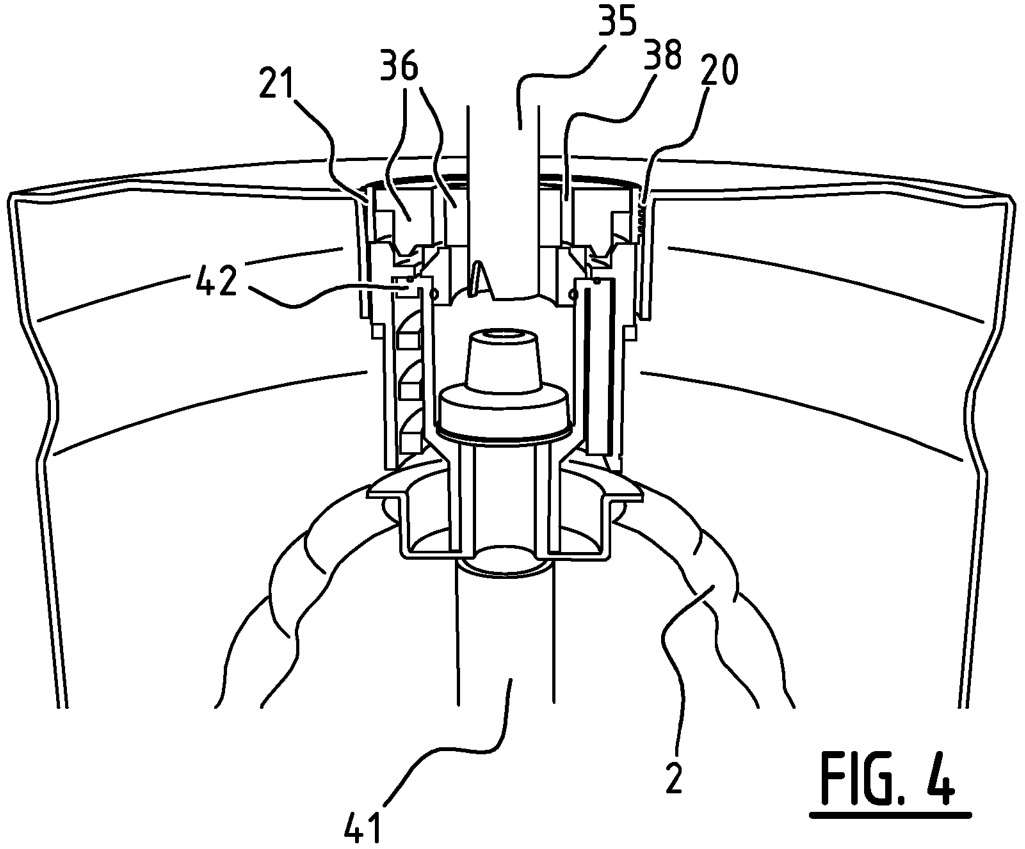

In the following description when reference is made to the concept of a "container" one can consider any type of holder for holding content, for instance a pressurized and/or carbonized liquid such as beer. However, the sealing unit as described herein is not restricted to application to this specific type of container. In fact the sealing unit as defined herein may also be applied to any other type of container, such as—but not limited to liquid jars, flasks, bottles, cartons, etc., FIG. 1 shows a cross-section of a liquid container 1 for storing, transporting, and serving a liquid, for instance a beverage like beer or any other alcoholic or non-alcoholic, carbonated or non-carbonated beverage. Carbonated drinks are generally kept under pressure in order to maintain carbon dioxide in solution, preventing the beverage from becoming flat. The liquid container 1 is therefore configured to allow the container to be pressurized (typical overpressure of 1 or more bar), meaning that the wall of the liquid container is strong enough to withstand a relatively high pressure inside the container. Usually the liquid cylinder 1 therefore has a cylindrical shape and is made of a rigid material, for instance steel or aluminum.

Referring to the embodiment of FIG. 1, in the interior of the liquid container 1 a collapsible, thin-walled (inner)

liquid bag 2 made of flexible material is arranged. In the interior 15 of the collapsible thin-walled bag 2 a beverage can be arranged while in the interspace 16 between the walls of the container 1 and the collapsible bag 2 an amount of gas can be arranged. The gas may be pressurized carbon dioxide ($CO_2$), a mixture of nitrogen and carbon dioxide or in fact any suitable gas (mixture) able to drive the beverage collected inside the liquid bag 2 out of the container 1. In other embodiments, not shown in the figures, no collapsible bag 2 is present and the gas is introduced into the same volume as the liquid.

The upper wall 3 of the container 1 comprises an opening 4 in which a sealing unit 8 may be attached to seal off the container 1 from the environment. The sealing unit 8 may have been provided with an external thread or outer thread 9 that may engage an internal thread or inner thread provided in the upper wall 3. The sealing unit 8 is configured to allow liquid (i.e. the beverage) and driving gas to enter the container or leave the container in a controlled manner. The sealing unit 8 may comprise separate seals for the liquid flow and the gas flow. The sealing unit 8 is further configured to allow coupling of a control unit 30 that is able to control the gas flow and liquid flow (for instance controlling both the flow rate and flow direction of each of the gas and liquid flow) to and from the container 1 when the container is filled or tapped.

Control Unit

FIG. 1 shows an embodiment of the control unit 30, while FIGS. 2-5B show only the lower part of the same control unit 30. The lower part of the control unit comprises a movable container interface coupler portion 32, herein also referred to as the keg interface coupler portion. The control unit 30 is configured to be coupled in a removable manner to the sealing unit 8. To this end the control unit 30 may be comprised of a control unit housing 33 comprising a coupling fitting 31, for instance a bayonet type coupling, for removably coupling the control unit housing 33 to a corresponding coupling fitting 34 of the sealing unit 8 attached to the container 1. The container interface coupler portion 32 is arranged inside the control unit 33 housing in a movable manner so that at least a part of the interface portion 32 may be moved in axial direction in the direction of the sealing unit 8 or in opposite axial direction (PA), for instance by operating lever 10.

The control unit housing 33 is internally provided with a number of passages for allowing passage of driving gas and liquid (beverage). More specifically, the control unit housing 33 may comprise a first inner tube 35 with a relatively small diameter and a second outer tube 36, arranged concentrically around the first inner tube 35 and having a larger diameter. The first, inner tube 35 provides a passage 37 for the liquid, while the second, outer tube 36 forms a passage 38 for the gas. Both tubes 35, 36 may be fixed to each other and movement of one of the tubes in an axial direction, causes the other tube to move along. In other embodiments, the inner and outer tubes are movable relative to each other in the axial direction (PA). For instance, both tubes 35, 36 may be arranged to be able to move telescopically with respect to each other in an axial direction (PA, FIG. 1). The control unit housing 30 further has a liquid input/output element 12 in fluid connection via a liquid passage 37 in (at least) the inner tube 35 with the interior 15 of the collapsible bag 2 for supply or discharge of the liquid (i.e. the beverage), respectively from a liquid supply (not shown) in the filling stage and towards a glass or similar receptacle in the dispensing stage (also referred to as the discharge or tapping stage), a gas input/output element 11 in fluid connection via the passage between the outer tube 36 and inner tube 35 with the interspace 16 between the outer surface of the collapsible bag 2 and the inner surface of the container wall for the supply of driving gas from a gas supply (not shown) into the interspace or discharge of gas out of the interspace for allowing a suitable liquid flow, and a lever 10 for controlling the axial movement of both the outer tube 36 and the inner tube 35. The sealing unit is configured to allow the axial movement of the outer tube 36 and inner tube 35 to operate both the gas seal and fluid seal, as will be explained later.

The inner tube 35 of the control unit 30 is part of a liquid passage 37. The liquid passage 37 extends through the control unit 30 (passage $37^1$, FIG. 5B) and all through the sealing unit 8 (passage $37^2$-$37^4$) and through a tubular element ("spear" or "down pipe") 41 connected to the sealing unit 8 (passage $37^5$) towards the interior 15 of the collapsible bag 2 so as to allow the liquid to flow towards the collapsible bag 2 in container 1 in the filling stage or to flow out of the collapsible bag 2 of the container in the discharge stage. In the liquid passage 37, more specifically in part 373 of liquid passage 37, a liquid seal is present. The liquid seal may be arranged in an open state to allow liquid to flow in either direction through the liquid passage 37 or to be in a closed state in order to block liquid from flowing through the passage 37 to-and-from the interior of the container. As mentioned earlier, the inner tube 35 may be connected through the liquid input/output element 12 to a liquid supply (not shown) that allows liquid (for instance beer) to move downward (i.e. downward in the shown arrangement, with the container arranged below the liquid input/output element 12. In other arrangements the liquid may of course flow in a different direction) through the liquid passage 37 or to a liquid tap to allow the liquid to move upward to be discharged.

The interspace between the outer side of the inner tube 35 and the inner side of the outer tube 36 of the control unit 30 forms a first part $38^1$ of a gas passage 38. The gas passage 38 extends not only through the control unit 30, but also through the sealing unit 8, and is configured to allow gas to flow to and from the container 1, more specifically into and out of the interspace 16 between the container wall and the collapsible bag 2. Referring to FIG. 5B, the gas may flow from the gas supply (not shown), the gas input/output element 11, parts $38^1$ and $38^2$ of the gas passage 38 in the control unit 30, and parts $38^3$-$38^7$ of the gas passage 38 in the sealing unit 8 into the interspace 16 between the container wall and the collapsible bag 2. Similarly, gas may flow in opposite direction from the interspace 16 via the gas passage $38^7$-$38^3$ inside the sealing unit 8, the gas passage $38^2$-$38^1$ inside the control unit 30 and the gas input/output element 11 into a gas collector (not shown) or into the surroundings. A gas flow controller (not shown) is connected to the gas supply and gas collector to balance the pressure inside and outside the container to allow the gas to flow in a desired direction.

In other embodiments (not shown) the collapsible bag 2 is dispensed with. In these embodiments the driving gas for driving out the liquid and the liquid itself may be maintained in the same volume within the container (so that the driving gas and the liquid are not separated from each other by the collapsible bag). The sealing unit 8 may also be applied in these embodiments.

Sealing Unit

Reference is made to FIGS. 2-5B showing a first embodiment of a sealing unit 8 and the lower end 32 of the control unit 30 of FIG. 1. The control unit 30 is shown to be attached to the sealing unit 8 by use of the coupling fittings 31, 34.

In the shown embodiment (cf. FIG. 5B) the coupling fitting is a bayonet type of coupling, so as to allow a quick coupling and decoupling of the control unit 30 to the sealing unit 8. However, other types of coupling may be employed as well.

The sealing unit 8 may comprise a generally cylindrical outer housing 20 to be attached to the container wall 3, using the external thread 9 provided on the housing 20 and the internal thread around the opening 4 in the upper wall 3. Inside the outer housing 20 an inner housing 40 is movably arranged. For instance, the inner housing 40 may be generally cylindrical as well and may be arranged concentrically with respect to the outer housing 20. Referring to FIG. 5B, the axial movement of the inner housing 40 relative to the outer housing 20 may be restricted by a radial circumferential flange 45 provided out the outer circumferential surface of the inner housing 40 and a radial circumferential flange 46 provided at the inner circumferential surface of the outer housing 20. The radial flange 46 of the outer housing 20 comprises a gas passage opening 47 or is size to provide the same (for instance formed by a gap between the radial outer end of the flange 46 and the outer surface of the inner housing part 40A), the gas passage opening 47 arranged so as to allow the passage of gas when the flange 45 of the inner housing 20 is spaced away from the flange 46 of the outer housing 20, while the flow of gas is blocked when the flange 45 of the inner housing 40 is caused to abut the flange 46 of the outer housing 20. In order to provide a gas-tight sealing the radial flange 45 of the inner housing 40 may be provided with an annular groove 49 into which a flexible O-ring 53 is arranged.

As mentioned earlier, the outer housing 20 comprises suitable attachment elements, for instance an external thread 9, configured to firmly attach the sealing unit 8 to corresponding internal thread in the upper wall 3 of the container 2. In the embodiment shown in FIGS. 1-12, the inner housing 40 comprises a inner housing part 40*a* fixedly connected to the remainder of the inner housing and sealed with respect to the same by an O-ring 43 so as to prevent liquid in the liquid passage 37 to pass from the liquid passage $\mathbf{37}^2$ into the gas passage $\mathbf{38}^3$, $\mathbf{38}^4$ and vice versa. In other embodiments, for instance the embodiment shown in FIGS. 13A-C. the inner housing part 40*a* is integrally formed with the remainder of the inner housing 40.

The movable inner housing 40 further comprises (at its bottom end) a tubular end part 64 configured to couple a bag connection element 60. The collapsible bag 2 is attached to this bag connection element 60. The collapsible bag 2 may be attached to the bag connection element 60 in a manner so as to completely the interior 15 of the bag from the interspace 16 between the container wall and the bag 2 so that no gas can enter the interior 15 of the bag. The bag connection element 60 is in turn provided with a tubular element 41 (down pipe or spear) reaching to a position close to the bottom of the bag 2 inside the container and providing a passage $\mathbf{37}^5$ for the liquid. Since the inner bag 2 and tubular element 41 are fixedly attached to the inner housing 40 of the sealing unit 8, they will move along with the axial movement of the inner housing.

In the embodiment shown in FIG. 5B, the bag connection element 60 comprises a tubular upper portion 63 that can be inserted into the tubular end part 64 of the inner housing 40. The outer surface of the tubular upper portion 63 of the bag connection element 60 may comprise one or more attachment elements that allow attachment of the bag connection element to the inner housing. An example of such attachment elements are the radial protrusions 61 shown in the figure, for instance a number of parallel ring-shaped ribs, allowing the bag connection element 60 to be snap-fitted to radial protrusions 62 provided at the inner surface of the tubular end part 64 of the inner housing 40 of the sealing unit 8. Furthermore, one or more support elements 110 extending generally upwardly from the bag connection element 60 may be provided so as to support the tubular end part 64 of the sealing unit 8 between the one or more support elements 110 and the tubular upper portion of 63 of the bag connection element 62. The support element(s) 110 avoids or at least reduces any twisting movement of the bag connection element 60 (and the tubular element or down pipe 41 attached thereto) relative to the sealing unit 8 and thereby ensures a proper alignment of the tubular element with the inner housing of the sealing unit.

Figure 15:
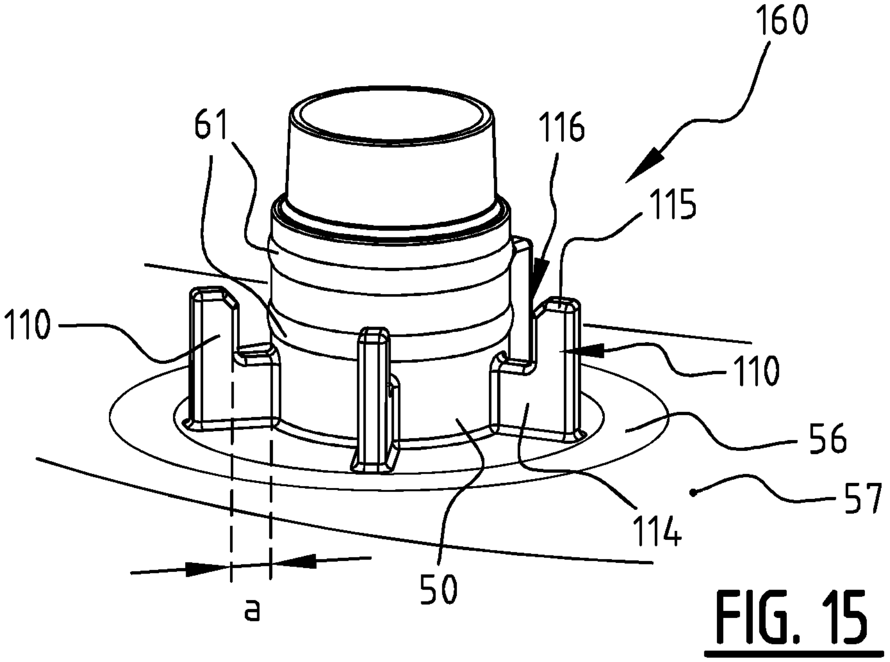
FIG. 15 is a side view of a portion of a collapsible bag in which an embodiment of a bag connection element is sealed.
Figure 16:
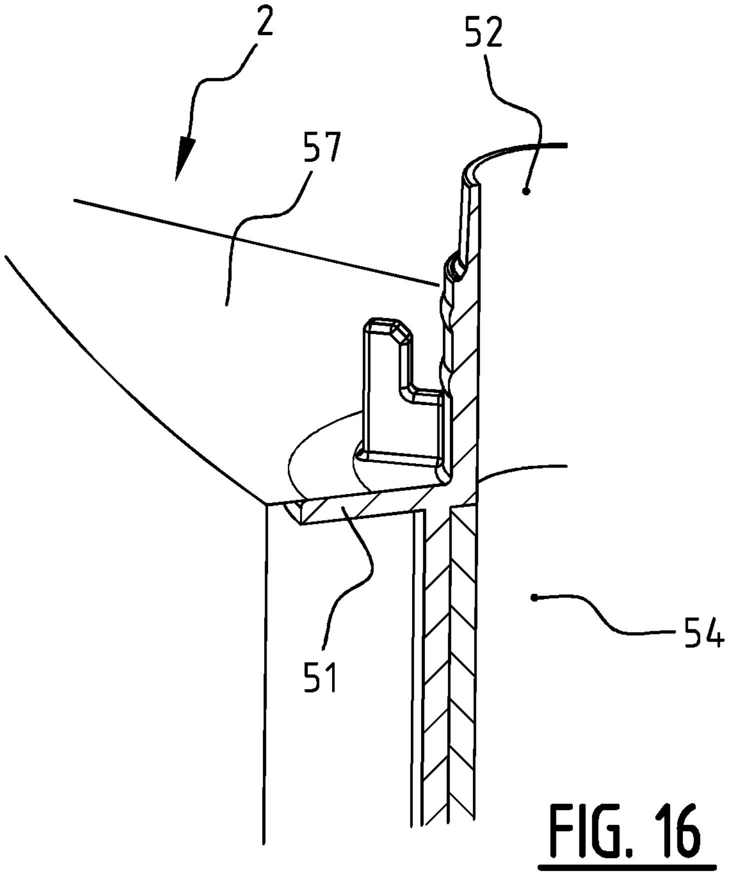
FIG. 16 is a partially cut-away detailed view of the bag connection element sealed to the collapsible bag.
Figure 17:
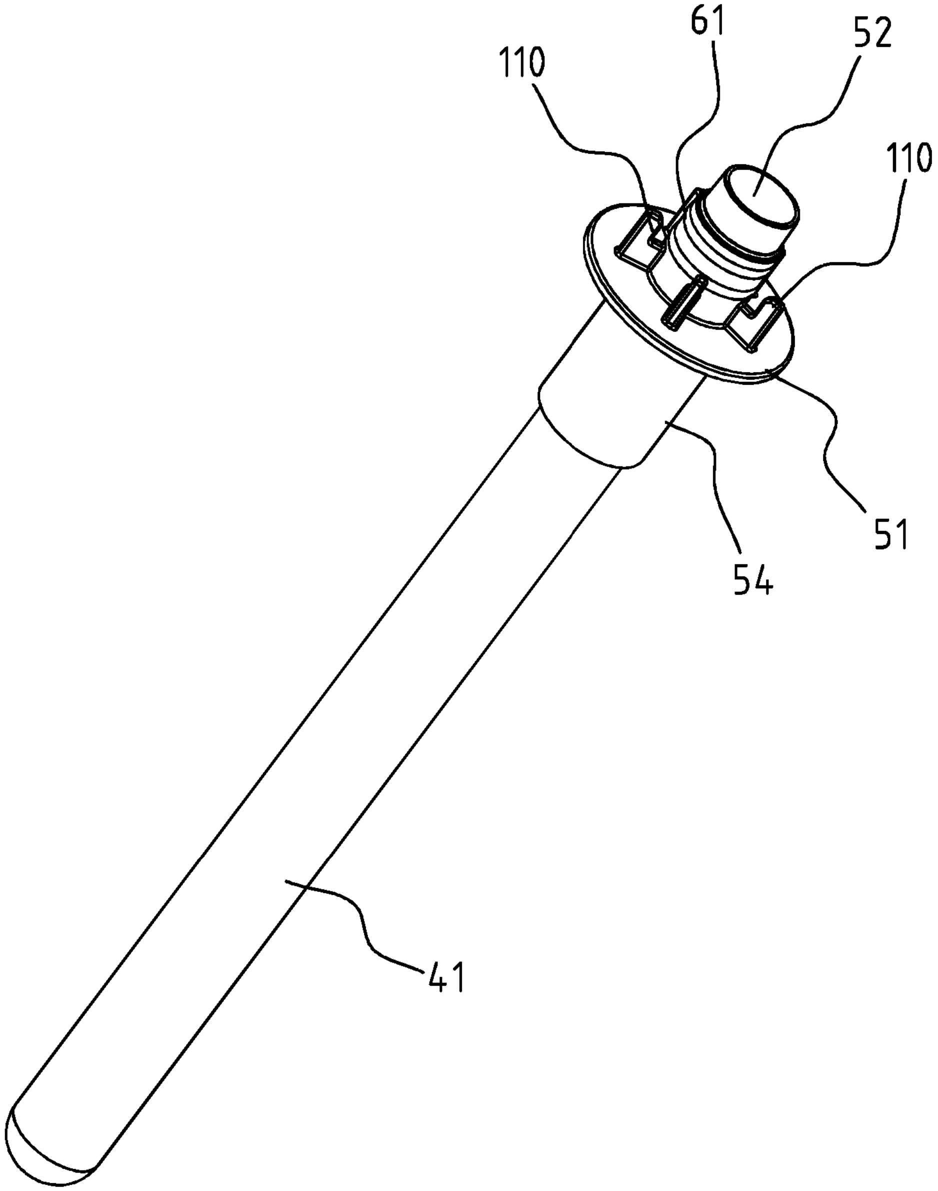
FIG. 17 is a side view of an embodiment of a tubular element to be coupled to a sealing unit using the bag connection element of FIG. 16.

In FIGS. 15-17 a different embodiment of a bag connection element 160 is depicted. In this embodiment the bag connection element 160 comprises a spout 50, for instance an injection-molded plastic spout, and the collapsible bag 2 is formed by a (spouted) pouch 57. The spout 50 has a radial attachment flange 51 that is attached at the inner surface of the pouch 57, for instance by a welding operation (cf. weld line 56). There are numerous alterative manners in which the spout 50 can be attached to the pouch 57, for instance by sealing in the attachment flange 51 between multiple layer of pouch material. The spout 50 may comprise an external tubular upper portion 52 extending outside the pouch 57 and may be configured to allow attachment of the spout 50 and the connected pouch 57 to a sealing unit, for instance any of sealing units 8, 8' and 108. In order to fix the external tubular upper portion 52 to the tubular end part 64 of the inner housing the outer surface of the external tubular upper portion 52 is provided with a plurality of ribs 61. The spout 50 may also provide an internal tubular part 54 extending inside the pouch 57. This internal tubular part 54 is configured to allow attachment of the elongated tubular element 41 (down pipe).

As shown in FIGS. 15 and 17, the attachment flange 51 has a plurality (for instance 5) of support elements 110 extending radially relative to the centerline of the external tubular upper portion 52 and evenly distributed over the circumference of the external tubular upper portion 52. Each of the support elements 110 comprises a lying support element part 114 and an upright support element part 115 (lying/upright relative to the attachment flange 51), that a space 116 allowing to receive the wall of the tubular end part 64 of the inner housing 40. Preferably the tubular end part 64 is sized to snugly fit in the respective spaces 116 provided by the support elements 110 (i.e. the width (a) of the space 116 essentially equals the thickness of the wall of the tubular end part 64) so that when the connection element 160 is inserted into the tubular end part 64 the external tubular upper portion 52 is not only attached to the inner housing using the ribs 61. but the connection element 160 will remain correctly positioned in the tubular end part 64 by the presence of the support elements 110.

Referring to the embodiment of FIGS. 1-12, inside the cylindrical outer housing 20 of the sealing unit 8 the movable inner housing 40 is arranged to be movable relative to the outer housing 20. More specifically, the inner housing 40 may be arranged inside the outer housing 20 to be movable in axial directions, i.e. in directions $P_{A1}$ (FIG. 5B) upward and downward along the imaginary axis of the cylindrical outer housing 20. The sealing unit 8 further comprises a biasing element, herein sometimes also referred to as a spring element, arranged between the outer housing 20 and inner housing 40 and configured to urge the movable inner housing 40 to move to a position wherein the passage of gas through the sealing unit is closed (i.e. sealed off. In the arrangement of FIG. 5B, the biasing element has the tendency to urge the inner housing 40 in an upward direction). In embodiments of the present disclosure the biasing element is comprised of a spring element 42, for instance (as shown) a helical spring arranged to surround the inner housing 40. The spring element 42 has one of its ends 111 supported on a spring element support 112, for instance a radial inward flange, of the outer housing 20. In embodiments of the present disclosure the bottom part of the spring element 42 may be attached to the outer housing 20. At the opposite end (i.e. at the upper end in the arrangement of the figures) the spring element 42 is supported by the earlier-mentioned circumferential flange 45 formed at the upper end of the inner housing 40.

Figure 5A:
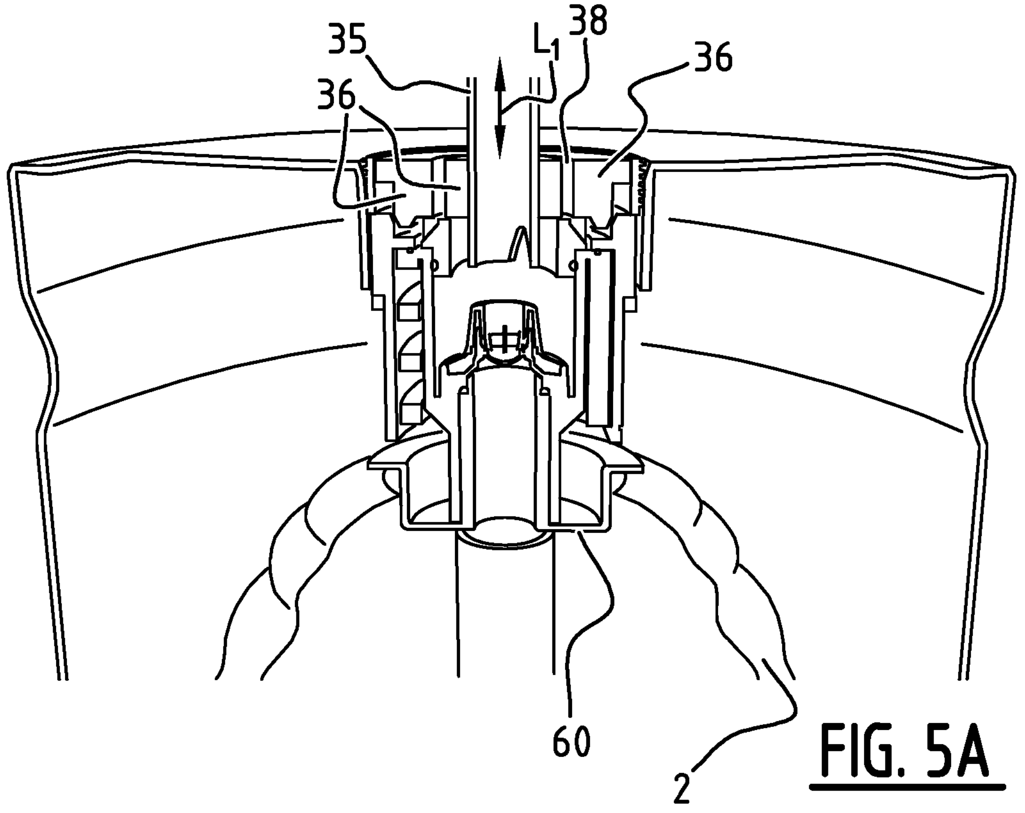
Figure 5B:
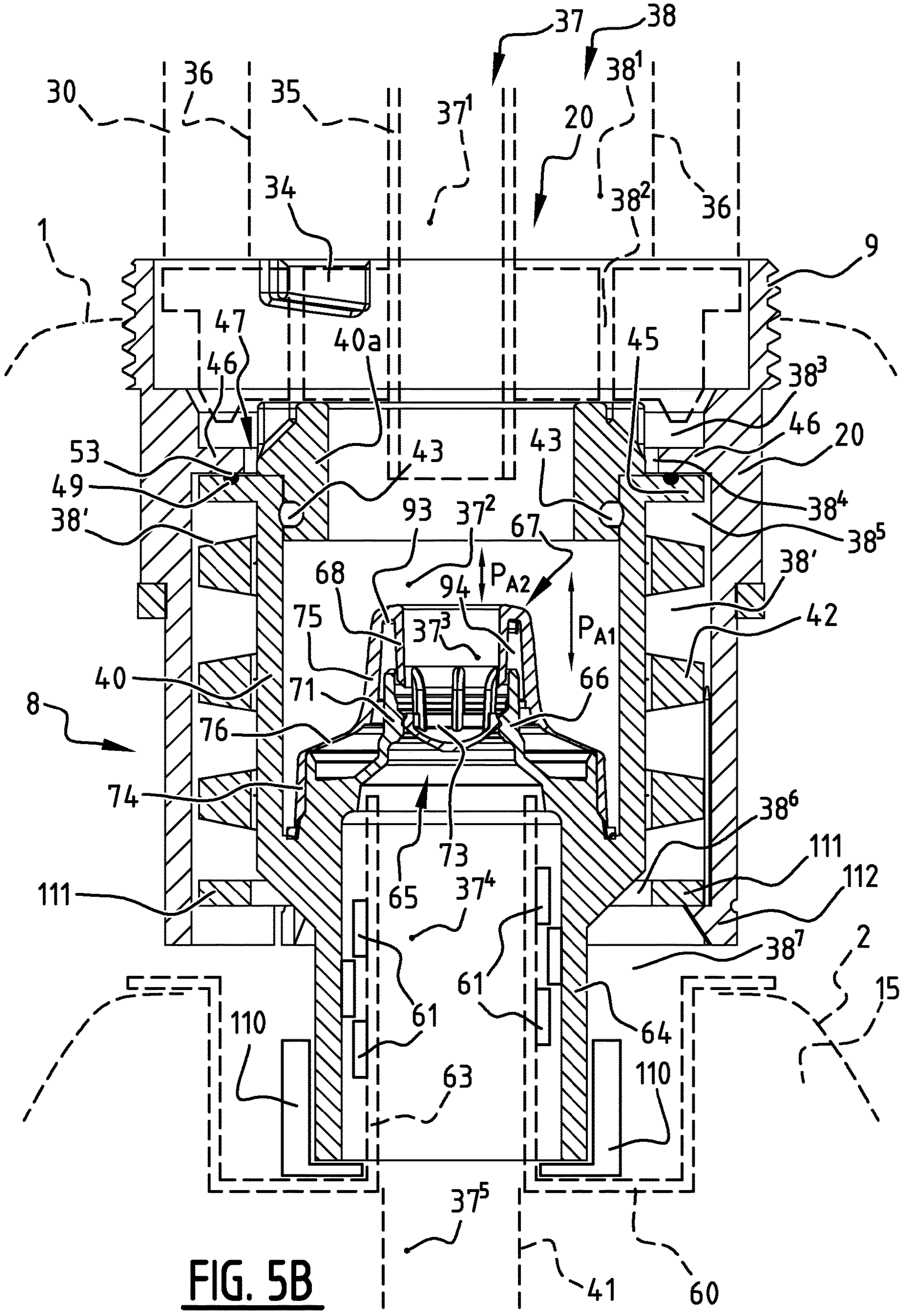
Figure 6:
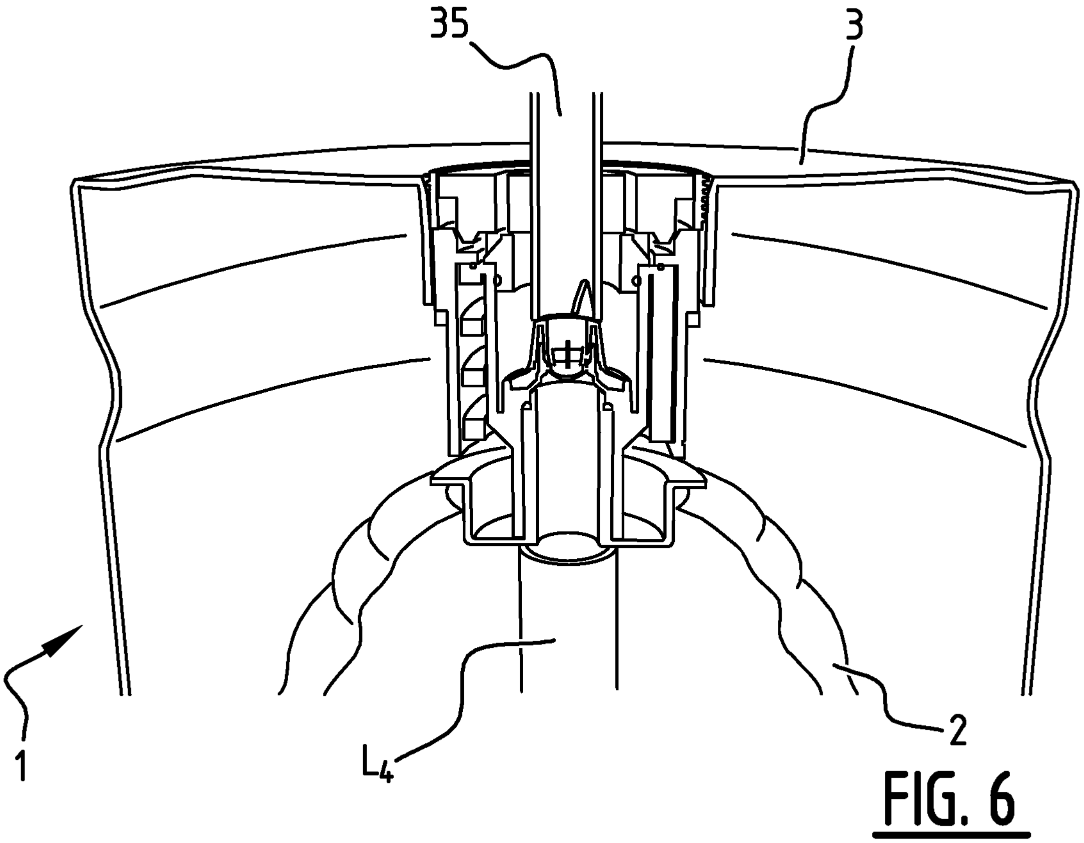

The spring element 42 may be configured to bias the inner housing 40 into the first position shown in FIGS. 5A and 5B. The first position is herein also referred to as the initial position, upper position or fully closed position. In this position the flange 45 of the inner housing 45 seals off the one or more gas openings 47 in the radial inward flange 46 of the outer housing 20 and thereby the entire passage 38 so that no gas may flow to and from the container 1. The spring element 42 allows the inner housing 40 to be forced by an external force opposite the biasing force (for instance a downward pushing action of the outer tube 36 of the control unit 30 on the inner housing part 40*a* of the inner housing 40 in the embodiments shown in FIGS. 1-12 or downward pushing force of the (inner) tube 135 in the embodiment shown in FIGS. 18-26) to move from the initial position (for instance shown in FIGS. 5A and 5B) axially downward to a second position (for instance shown in FIGS. 7A and 7B, i.e. a position wherein the gas seal is open and the liquid seal is still closed) allowing gas to flow through the passage 38 (i.e. the passage $\mathbf{38}^1$ and $\mathbf{38}^2$ inside the control unit 30, passage $\mathbf{38}^3$ between the upper end of the outer housing 20 and the inner housing 40, passage $\mathbf{38}^4$ through the opening(s) 47, the passage $\mathbf{38}^{4a}$ now formed between the flanges 45 and 46, passage 385 along the interspace(s) between the spring element 42 and outer housing 20/inner housing 40, passage 386 at the lower end of the outer housing 20 and passage $\mathbf{38}^7$ leading to the interspace 16 inside the container 1 (see also FIG. 8 and the arrows $G_2$, $G_3$ and $G_4$ in FIG. 7B). When the external force is stopped, the inner housing is urged by the above-mentioned biasing force of the biasing element, for instance by spring action of the spring element 42, to move automatically (i.e. without any external intervention) from the second position axially (upward) back to its initial first position and then seals again the passage $\mathbf{38}^{4a}$ and thereby the opening 47 in the flange 46 of the outer housing 20.

Furthermore, inside the axially movable inner housing 40 a liquid seal unit 65 is arranged. This liquid seal unit 65 is opened by an external force, for instance a downward pushing action of the inner tube 35 of the control unit 30 on the upper end of the liquid seal unit 65 (more specifically on the upper end of the valve element 68 to be described hereafter). Similar to the gas seal, the liquid seal unit 65 is closed automatically in absence of this external force. More specifically, the liquid seal unit 65 is closed by the biasing action of a further biasing element, for instance the flexible, for instance resilient or elastic, connection element 76 to be described hereafter.

Figure 9A:
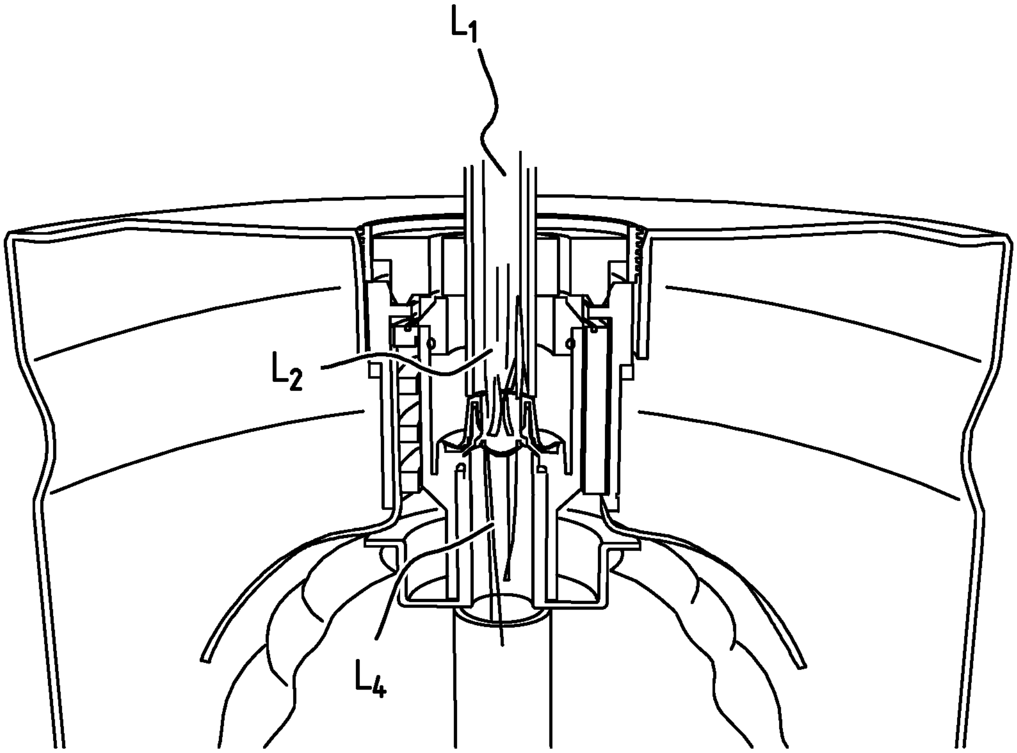
Figure 9B:
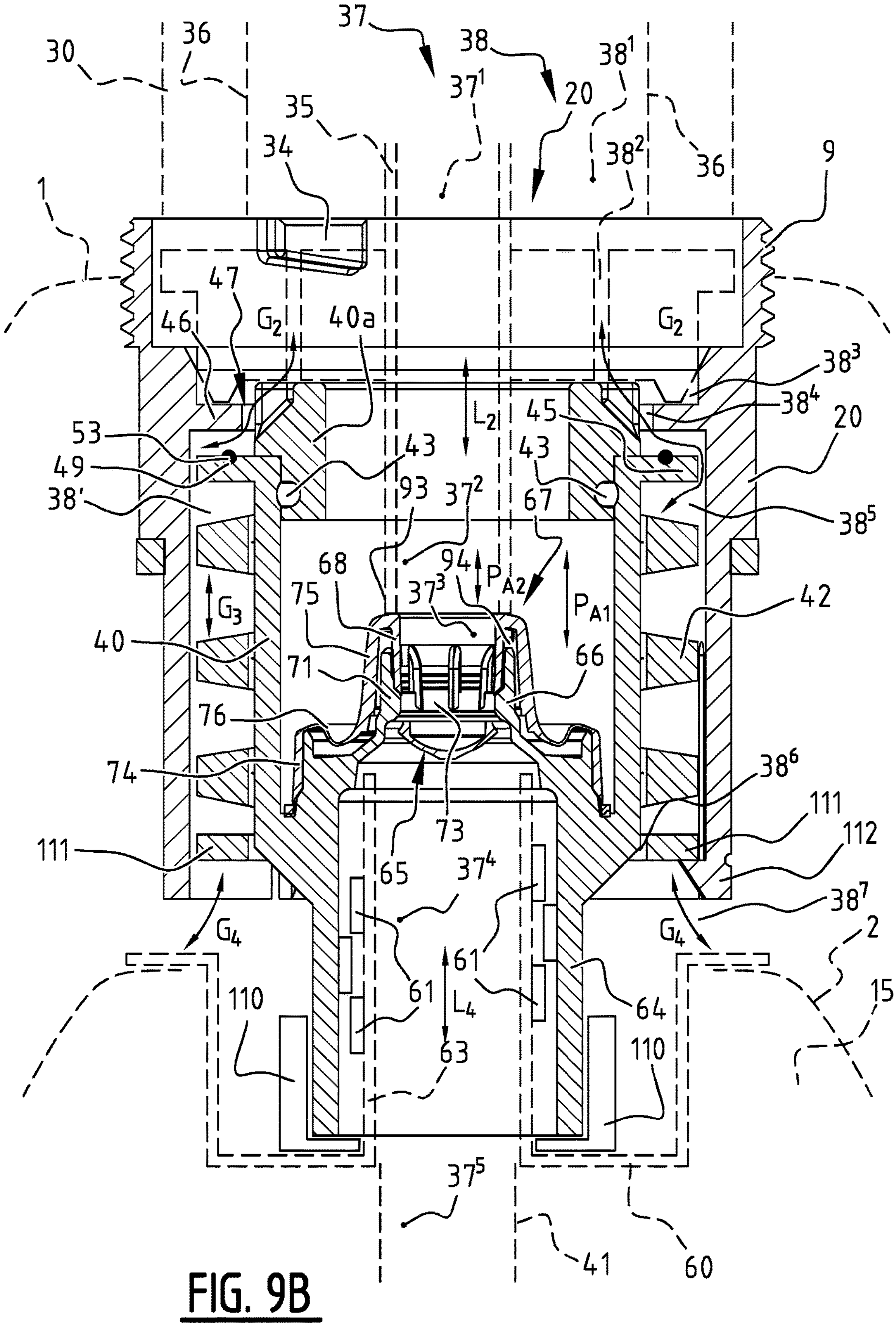
Figure 10:
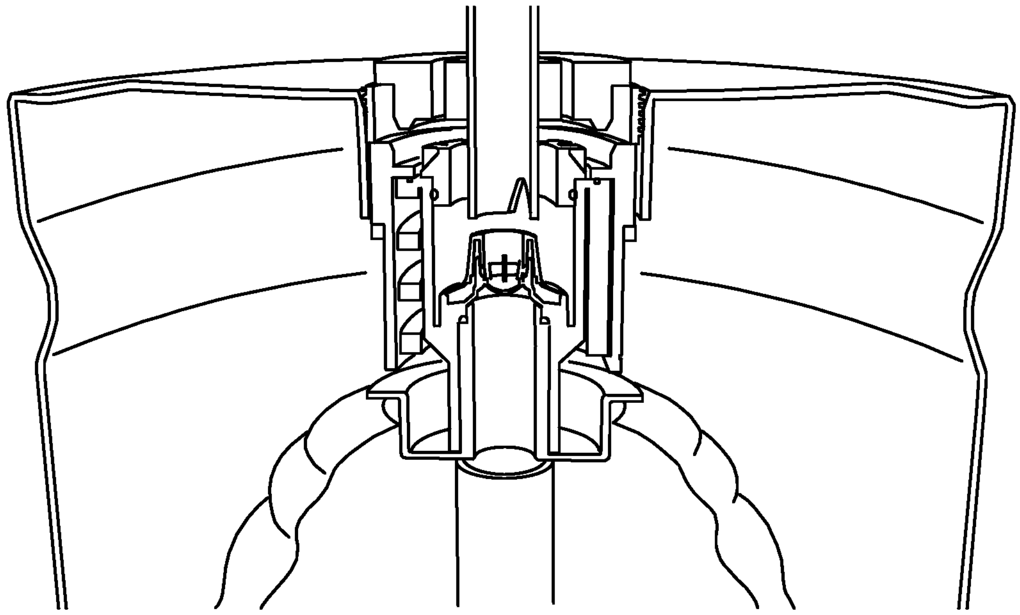
Figure 11:
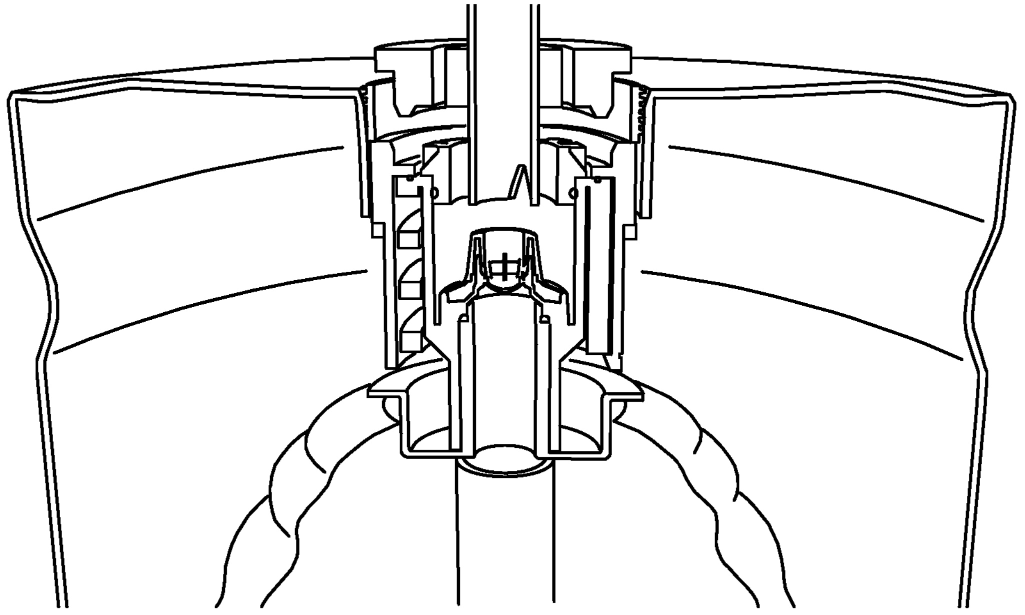
Figure 12:
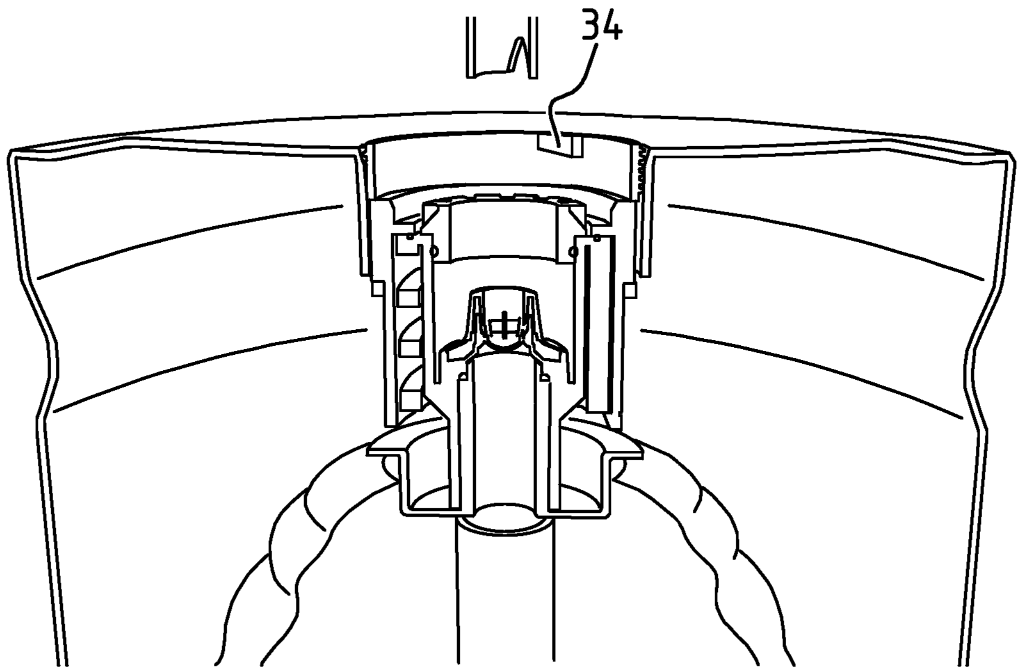

The liquid seal unit 65 comprises (cf. FIG. 5B) a base 66 fixedly connected to the inner housing 40 and including a tubular base element 71. The liquid seal unit 65 further comprises a valve 67, the valve 67 including a tubular valve element 68 arranged to be axially movable (directions $P_{A2}$) inside the tubular base element 71. The tubular valve element 68 has a number of radial openings 73 that allow (only if the liquid seal unit 65 is in the open position, as shown in FIGS. 9A, 9B) passage of liquid arriving from the passage $\mathbf{37}^1$ inside the control unit 30, the passage $\mathbf{37}^2$ inside the upper part of the inner housing 40, and the passage 373 inside the tubular base element 71/tubular valve element 68 towards the passage 37' in the lower part of the inner housing 40 and finally to the passage $\mathbf{37}^5$ formed inside the tubular element or spear 41 that is in open fluid connection with the interior volume 15 of the collapsible bag 2. In the closed position (FIGS. 5A/5B. 7A/7B) the liquid passage 37' is sealed off by the valve 67 and no liquid (beverage) is allowed to move from this liquid passage 373 to the liquid passage $\mathbf{37}^4$ and vice versa.

The valve 67 comprises an axially movable tubular valve element 68, a valve connection element 74 for attaching the valve 67 fixedly to the inner housing 40, an axially movable tubular valve member 75 connected to or formed with the axially movable valve element 68 and a flexible connection element 76 between the axially movable tubular valve member 75 and the valve connection element 74 (that is stationary (non-movable) with respect to the inner housing 40). The flexible connection element 76 is an example of a further biasing element configured to urge the movable tubular valve element 68 to move to a (closed) position (FIGS. 5A, 5B, 7A, 7B) wherein the liquid passage is closed and wherein the interior of the inner bag (if present) is sealed from the environment. For instance, the flexible connection element 76 is configured to allow the tubular movable valve element 68 to be moved from the closed position (FIGS. 5A, 5B, 7A, 7B) to the open position (FIGS. 9A, 9B) under the influence of the external force, while urging the tubular movable valve element 68 to return from the open position to the closed position when no such external force is applied.

Consequently, in the embodiment shown in FIGS. 1-12, the inner housing 40 is arranged to be movable relative to the outer housing 20 in axial direction to open or close the gas passage 38, while, essentially independently from the movement of the inner housing 40 relative to the outer housing 20, the valve 67 may be axially moved relative to the inner housing 40 to open or close a liquid passage 37 between the interior 15 of the bag 2 and the liquid input/output element 12 allowing liquid to flow (cf. FIGS. 9A, 9B) to and from the container (see also arrows L1-L4 denoting the liquid flow). In other embodiments the opening and closing the liquid seal unit 65 may be made dependent on the opening and closing of the gas seal, for instance by one element (for instance a (n) (inner) tube, causing the valve of the liquid seal unit to co-move with the movement of the inner housing 40 opening the gas seal). When no external force is exerted onto the liquid valve 67, the valve will be automatically closed by action of the flexible connection element 76 thereby sealing off the liquid passage 37. When also no external force is exerted onto the inner housing 40, the "gas valve" formed by the inner and outer housing will be automatically closed by action of the biasing element 42, thereby sealing of the gas passage 38.

FIGS. 6-12 show respective operations during the filling stage of the container. If it will be clear to the skilled person that the operations will be performed in a different order in the discharge stage. The figures show that first the control unit 30 is mounted to the sealing unit 8. Then then the lever 10 is operated causing the outer tube 36 and the inner tube 35 and to move axially into the sealing unit 8 for exerting respective axial external forces onto the upper end of the inner housing 40 (i.e. on inner housing part 40*a* of the inner housing 40) and onto the liquid seal unit 65. A first external axial force is exerted by the outer tube 36 on the inner housing 40 so as to move the inner housing from the first axial position to the second axial position. Next, in the filling stage, gas may be supplied through the gas flow passage 38 into the container. The gas may be supplied directly to the interior of the container or into the interspace 15 between the container wall and a collapsible bag 2 arranged inside the container. In the discharging stage gas instead is removed from (the collapsible bag inside) container through the gas flow passage 38. Next a second external force is exerted by the inner tube 35 on the tubular valve element 68 so as to move the tubular valve element 68 from the closed position to the open position. Then liquid may be supplied (in the filling stage) through the liquid flow passage 37 into the container 1, or, when the collapsible bag 2 is present, into the interior 15 of the collapsible bag 2. Alternatively, in a discharge stage, liquid may be removing from the container through the liquid flow passage. Then the external forces are reduced or removed by moving the inner tube 35 and outer tube 36 back (in the opposite axial direction) by operating the control unit 30. This causes the inner housing 40 and the tubular valve element 68 to automatically move back to their respective initial (close) positions.

It is clear that the timing of opening and closing of the gas seal and liquid seal is dependent on the dimensions of the inner and outer tube, on whether or not the inner and outer tube are axially movable relative to each other, etc. For instance, if the inner and outer tube are fixed to each other or of both the gas seal and liquid seal are operated by one and the same element, for instance one (inner) tube, then the timing difference between opening/closing the gas seal and opening/closing the liquid seal, may be constant (for instance, when opening both seals, first the gas seal may be opened and then the liquid seal is opened, while when closing both seals, first the liquid seal may be closed before the gas seal is closed. The timing difference may also be zero, meaning that both the gas seal and liquid seal are opened and closed synchronously). In other embodiments, for instance in embodiments wherein the gas seal is operated independently from the liquid seal, the timing difference may be made variable.

Figure 13A:
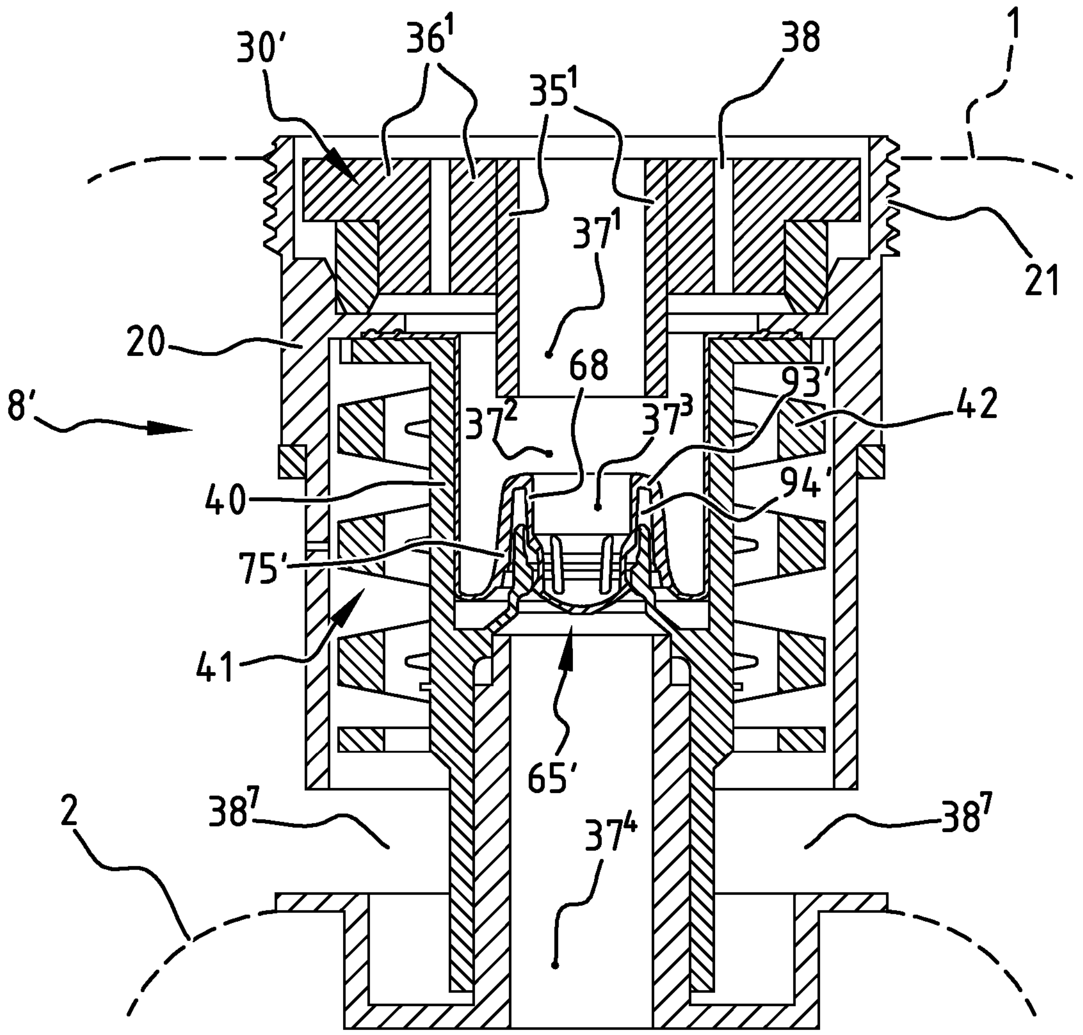
FIGS. 13A, 13B, and 13C show cross-sections of a second embodiment of a sealing unit and portions of the control unit and container, wherein in FIG. 13A both the gas seal and liquid seal are closed, in FIG. 13B the gas seal is open and the liquid seal is closed and in FIG. 13C both the gas seal and the liquid seals are open.

FIGS. 13A-13C and FIG. 14 show a second embodiment of a sealing unit 8', a part of the control unit 30' and a part of the container 1 including the collapsible bag 2. The sealing unit 8' in FIG. 13A is shown in a state wherein its gas seal and liquid seals are closed, in FIG. 13B the gas seal is open and the liquid seal is closed, while in FIG. 13C both the liquid seal and the gas seal are open. The sealing unit 8' corresponds to the sealing unit 8 described earlier with the exception that the liquid seal unit 65 of the sealing unit 8' is embodied differently, as is more specifically shown in FIG. 14. The liquid seal unit 65' is attached in a different manner to the inner housing 40 of the sealing unit 8'. Furthermore, in this embodiment, the inner housing part 40*a* of the inner housing 40 is dispensed with so that the inner and outer tubes 35', 36' of the control unit 30' may directly contact the inner housing 40 and the valve, respectively. Finally, a gas-tight sealing between the flanges of the inner and outer housing which in the embodiments of FIGS. 2-12 is formed by the flexible O-ring 53 in the annular groove 49, is now provided by the liquid seal unit 65' itself. In this sense the liquid seal unit 65' not only seals the liquid passage 37, but also may help sealing off the gas passage 38.

As shown in FIGS. 13A-13C, and 14, the valve connection element 74 and the flexible connection element 76 of the first embodiment have been replaced by a valve connection element 78 and a flexible connection element 79, respectively. The flexible connection element 79 is configured (for instance made flexible enough) to function as a further biasing element: it allows the valve to be moved from the closed state to the open state (i.e. moved downward in the shown arrangement) when an external force is exerted on top of the valve, for instance by the inner tube 35, while it will automatically bring the valve back from the open state to the closed state in absence of an external force on the valve.

The valve connection element 78 is generally cylindrical and has a sealing extension 80 extending onto the radial flange 45 of the inner housing 40 allowing a good seal between the radial flange 45 of the inner housing 40 and the radial flange 81 of the outer housing 20, when the inner and outer housings are in the first (initial) position. In this position the gas passage is completely sealed off and no gas may flow into and out of the container 1. As shown in FIGS. 13A-13C and 14, the sealing extension 80 of the liquid sealing unit 65' may have one or more optional integrated O-shaped seals rings 69 (in the figures two rings are shown) formed with the sealing extension 80 to improve the sealing characteristics, similar to the O-ring 53 used in the first embodiment of the sealing unit.

Figure 13B:
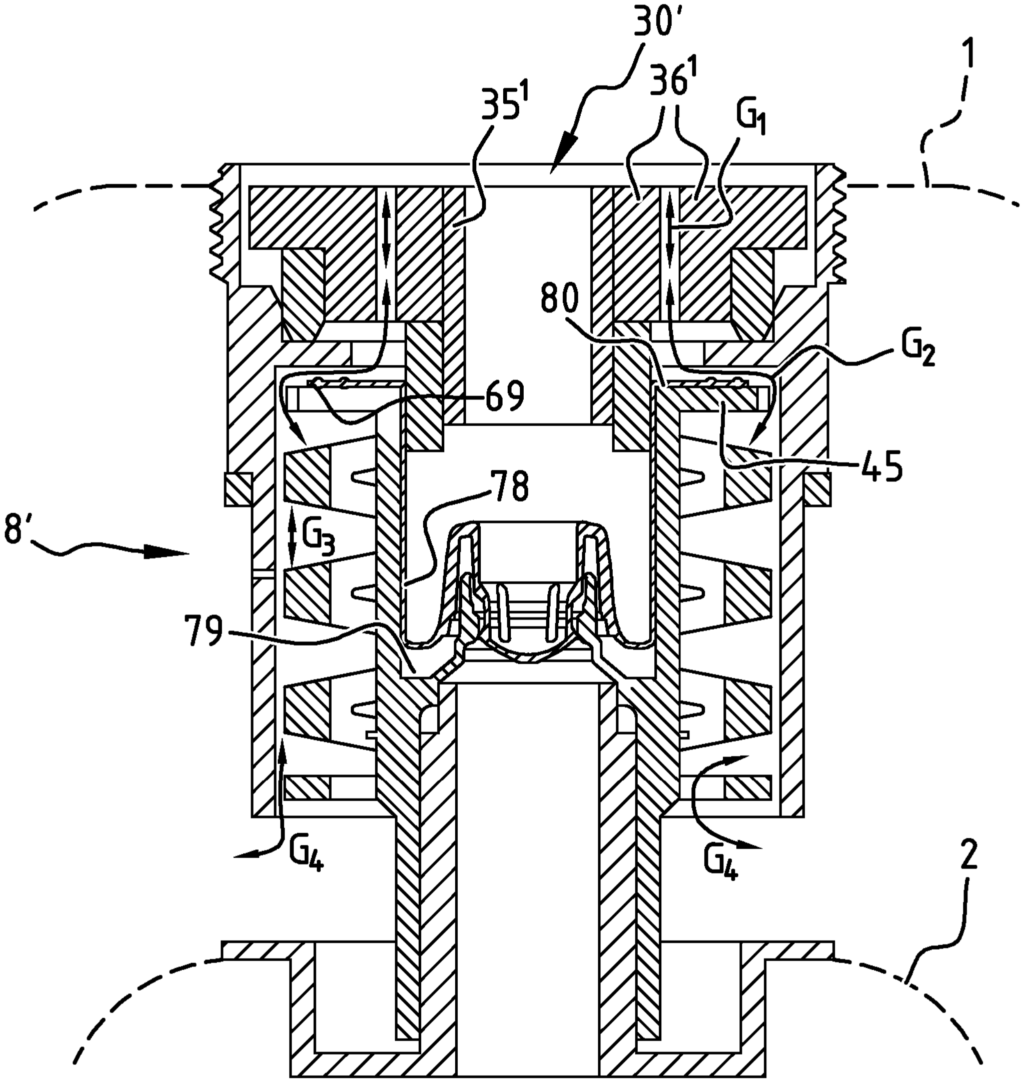
Figure 13C:
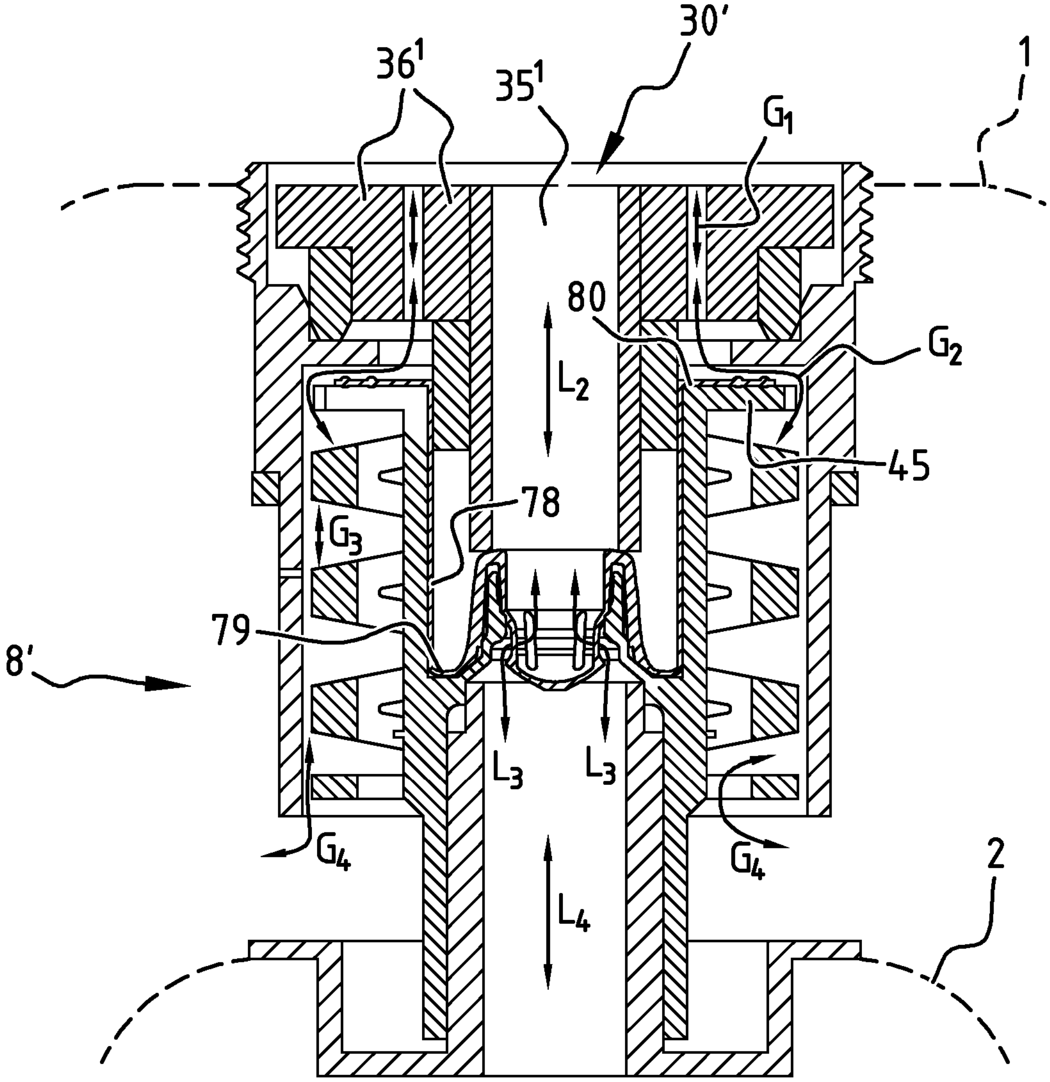
Figure 14A:
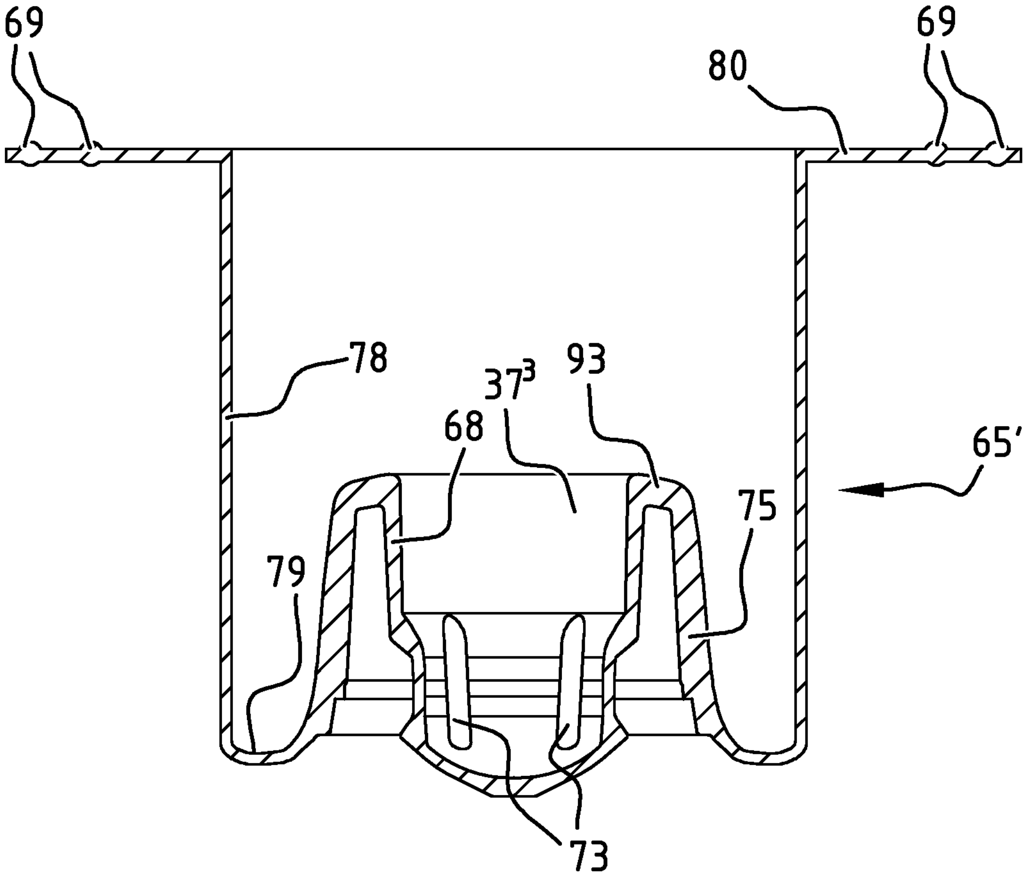
FIG. 14A shows a cross-section of the liquid seal unit in accordance with the second embodiment of FIGS. 13A-13C; [.]
Figure 14B:
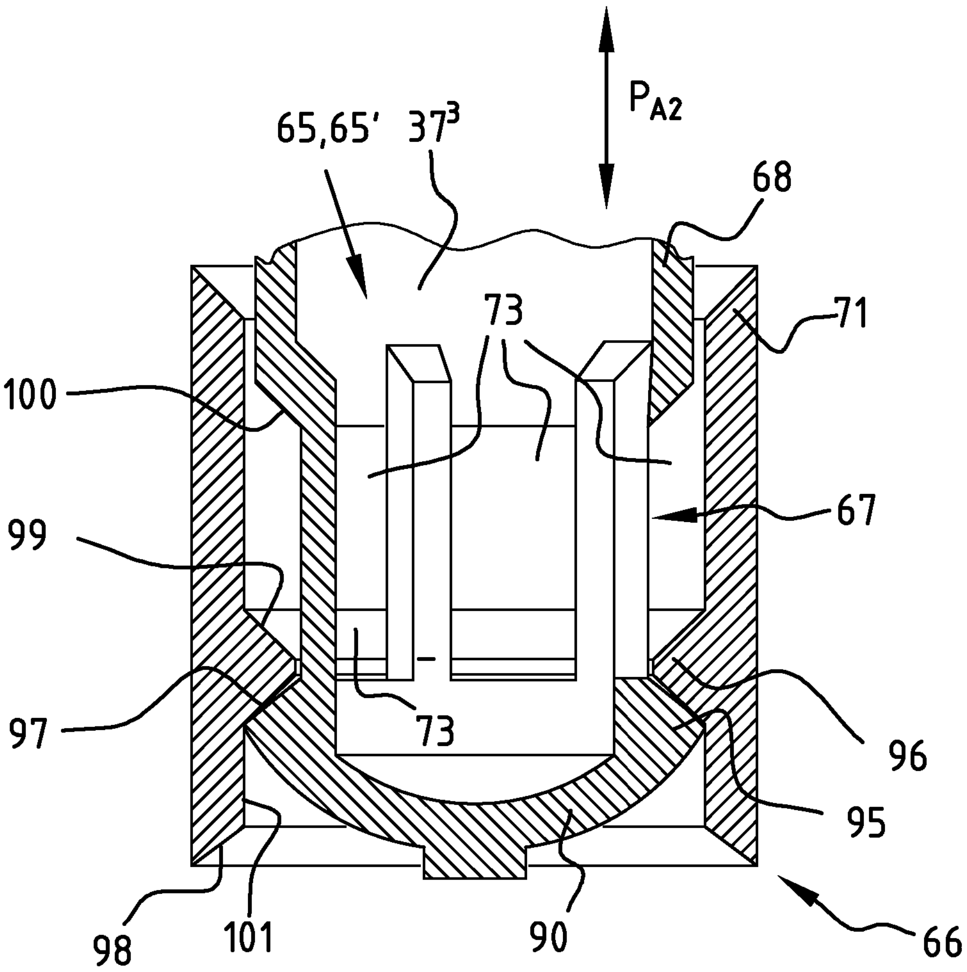
Figure 14C:
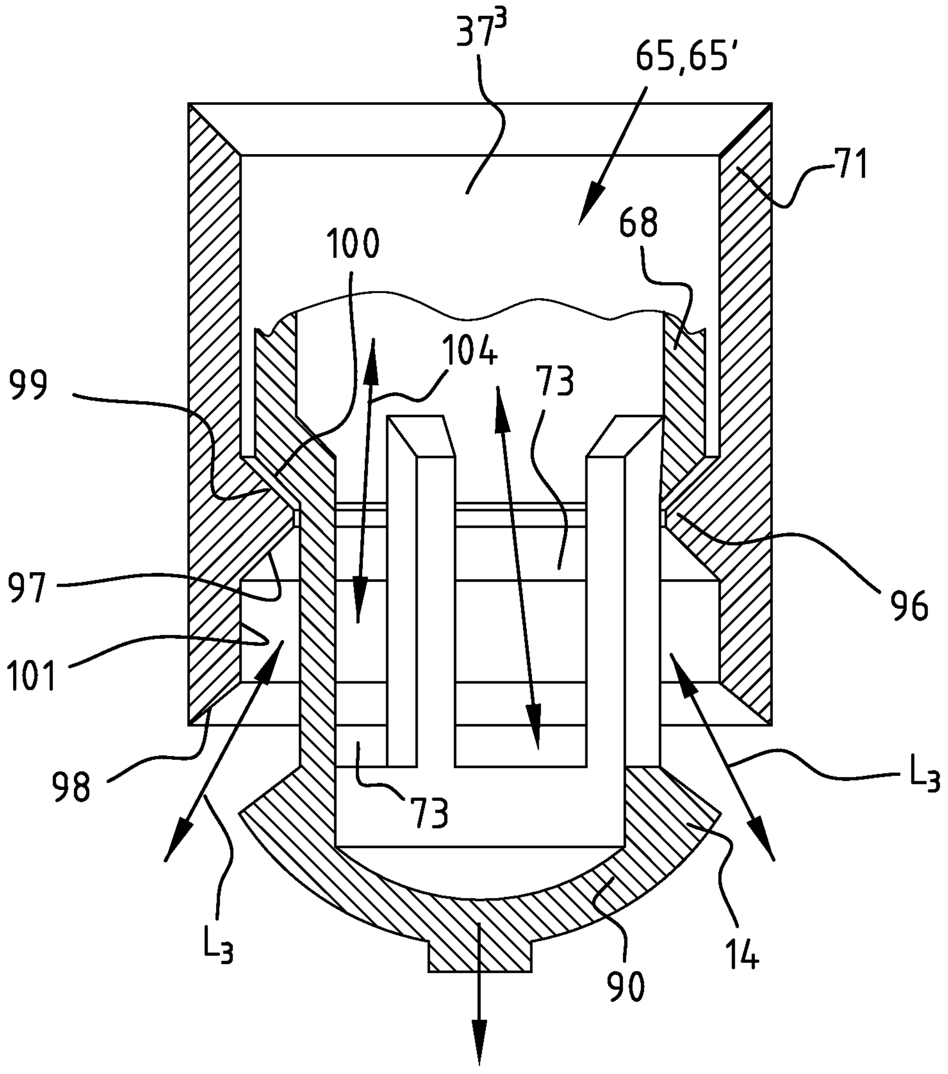

In FIGS. 14B and 14C a portion of a liquid sealing unit corresponding to the liquid sealing unit 65 of FIGS. 1-12 and the sealing unit 65' if FIGS. 13A-13C. 14 is depicted. FIG. 14B shows a portion of the liquid seal unit 65, 65' in a closed position, while FIG. 14C represents the liquid seal unit in an open position. The tubular valve element 68 of the valve 67' is arranged coaxially in the tubular base element 71 of the base 66 and is movable in axial direction ($P_{A2}$, in the figures, upward and downward) relative to the stationary tubular base element 71 (i.e. stationary relative to the inner housing 40 which in itself is movable to open or close the gas seal) between (at least) two different axial positions. The tubular valve element 68 is configured for valve-activation. More specifically, the tubular valve element 68 constitutes a maneuver body in the form of a valve stem which may open or close the liquid passage 373 of liquid through the liquid seal unit 65, 65'. The tubular valve element 68 comprises at its upstream end a seal member 90. The seal member 90 may be formed by an end wall. This end wall of the tubular valve element 68 is closed, but in the side surface of the tubular valve element 68 the one or more radial openings 73 are present allowing liquid to flow from the container 1, through the liquid seal unit passage 373 to the outside (or vice versa), when the valve is in the open position of FIGS. 9A, 9B, 13C and 14C.

DETAILED DESCRIPTION

As shown in the figures, tubular valve element 68 is connected via a top wall 93 to an outer tubular wall formed by the movable tubular valve member 75. The outer tubular wall defines a tube with a larger diameter than the tubular valve element 68 to define a gap 94 between them. Furthermore, the flexible connection element 76 is formed with a flexible (resilient) wall extending obliquely or transversally relative to the axial direction. The valve connection element 74 is mounted firmly to inner housing 40. The flexible connection element 76 enables the tubular valve element 68, 68' to be movable upward or downward between the closed position shown in FIG. 14B and the open position shown in FIG. 14C relative to the inner housing 40. For opening and closing of the liquid passage 373 the valve comprises a sealing body, preferably a sealing body formed by an elastic ring-shaped seal collar 95 extending inwardly towards the tubular valve element 68. The sealing body 95 is located at the seal member 90 of the tubular valve element 68. The seal collar 95 may be formed from a suitable plastics material, which is elastic by nature. As mentioned above, the tubular valve element 68 is also provided with several radial openings 73. These radial opening 73 are located immediately downstream of the seal collar 95. Thereby, discharge of a liquid will take place through the radial wall openings 73 and the tubular valve element 68 when the valve is in the open position. Along its inner periphery, the tubular base element 71 is provided with a ring-shaped seal bulb 96 extending into the tubular base element 71. The seal bulb 96 includes a storage seal seat 97 structured for sealing reception of said seal collar 95 when the valve is in the closed position, such as shown in FIG. 14B.

Furthermore, the tubular base element 71 is provided with a ring-shaped end seat 98 being one of several utility seal seats in the tubular base element 71. In this exemplifying embodiment, the end seat 98 is comprised of an bevel edge formed at the tubular base element 71. The end seat 98 is structured for sealing reception of the seal collar 95 when the valve is in the closed position. Thus, the valve is structured for opening of the passage 37" by virtue of axial movement of the seal collar 95 relative to the inner housing 40, and away from the end seat 98.

The seal bulb 96 also includes a downstream-directed, ring-shaped stop seat 99. This stop seat 99 is structured for motion-limiting contact with an external stop collar 100 formed around the tubular valve element 68 in a region located downstream of said radial openings 73 and downstream of the seal bulb 96. FIG. 14C shows the stop collar 100 in contact with the stop seat 99 subsequent to a valve opening axial movement of the tubular valve element 68.

The tubular base element 71 also includes an internal and cylindrically shaped seal portion 101 located in a longitudinal portion between said end seat 98 and the seal bulb 96. The seal portion 101 may be structured for slide-sealing against the seal collar 95. When in its radially expanded position, this seal collar 95 is arranged to have a marginally larger diameter than the diameter of the internal, cylindrical seal portion 101. The seal collar 95 will be somewhat compressed radially when positioned in the seal portion 101. Thus, all of the seal seats 97, 98, 101 may be structured for sealing against the seal collar 95 during axial movement thereof.

Figure 26:
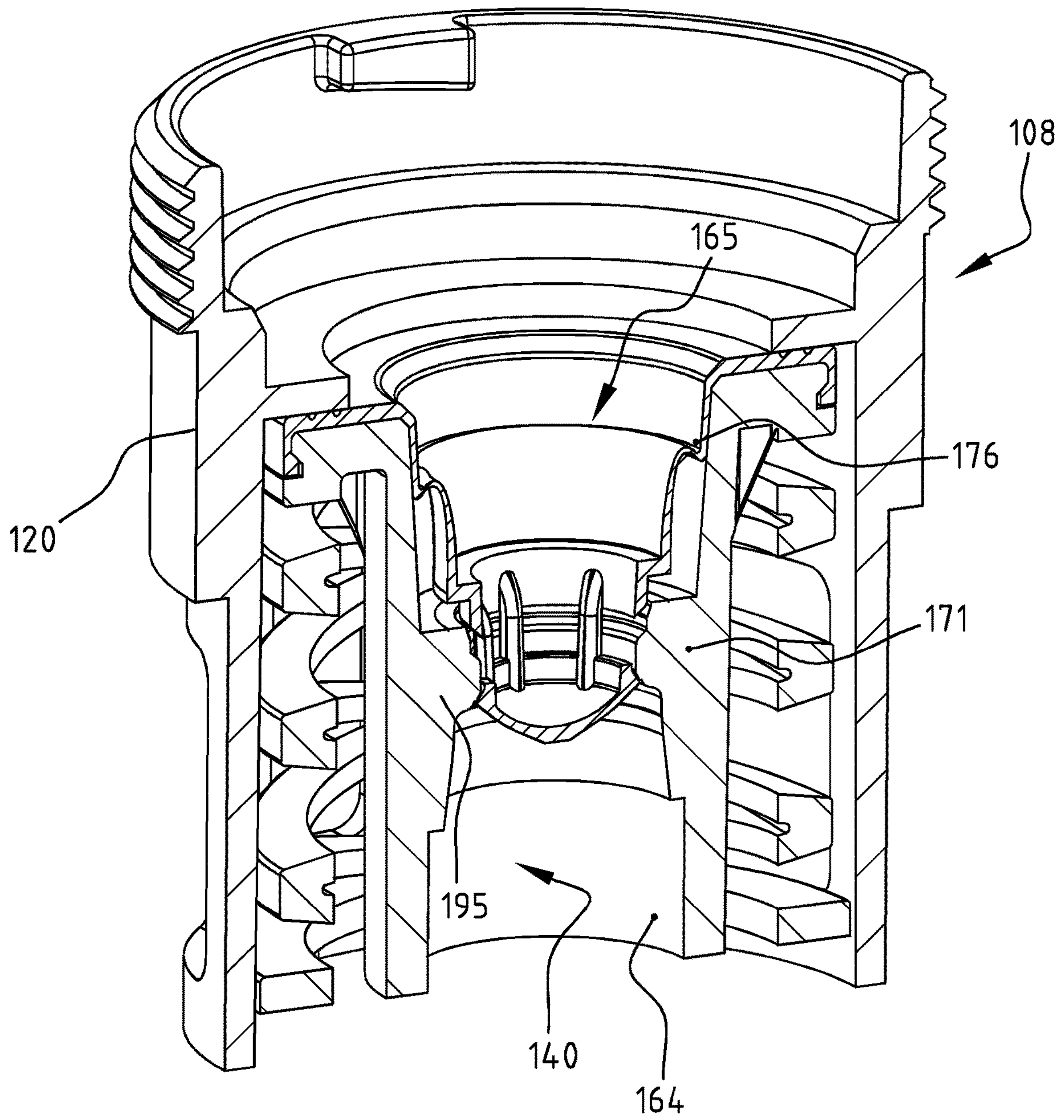

FIG. 26 shows a further embodiment of a sealing unit 108. Similar to the sealing units 8 and 8' described earlier, the sealing unit 108 comprises an outer housing 120, an inner housing 140 and a liquid seal unit 165. The liquid seal unit 165 is show in more detail in FIGS. 18 and 19, the outer housing 120 is shown in more detail in FIGS. 20, 21 and 25, and the inner housing 140 is shown in more detail in FIGS. 22-24. Finally, the operation of the sealing unit 108 is elucidated in FIGS. 27A-27C.

Referring to FIGS. 20, 21, 25 and 26, the outer housing 120 has a generally cylindrical shape. At the upper portion of the outer housing 120, the outer side thereof, an external thread or outer thread 109 that may engage an internal thread or inner thread provided in the upper wall 3 is provided. At the inner side of the upper portion of the outer housing 120 a coupling fitting 134, for instance a bayonet type of the fitting, may be formed so as to allow a control unit 30, 30' to be removably coupled to the sealing unit 108. At the lower portion a number of radial gas openings 149 have been provided in order to allow gas to stream into or out of the outer housing 120.

The inner housing 140 has an essentially cylindrical shape as well and is sized to be able to be moved in axial direction inside the outer housing 120. The top 148 of the inner housing 140 (herein also referred to as the spring top) is formed by a radial flange 145, while the base of the inner housing 140 comprises a spring base 147. Between the spring top 148 and spring base 147 a spring element 142 is provided. The spring element 142 is permanently connected to or integrally formed with the radial flange 145 extending at the upper portion from the inner housing 140. At the bottom side the spring element 142 is connectable to the inner housing 140, for instance by a snap-fit connection to be described later.

In the shown embodiment the spring element 142 basically is a helical spring 146 surrounding the inner housing 140. The helical spring 146 may be formed by plastic material and may have a shape of a double helix. The spring element 142 is arranged to allow the spring top 148 and therefore the inner housing 140 connected thereto or formed therewith, to be moved in axial direction relative to the outer housing 120, more specifically to a spring element support at the inner surface of the outer housing 120.

Figure 7A:
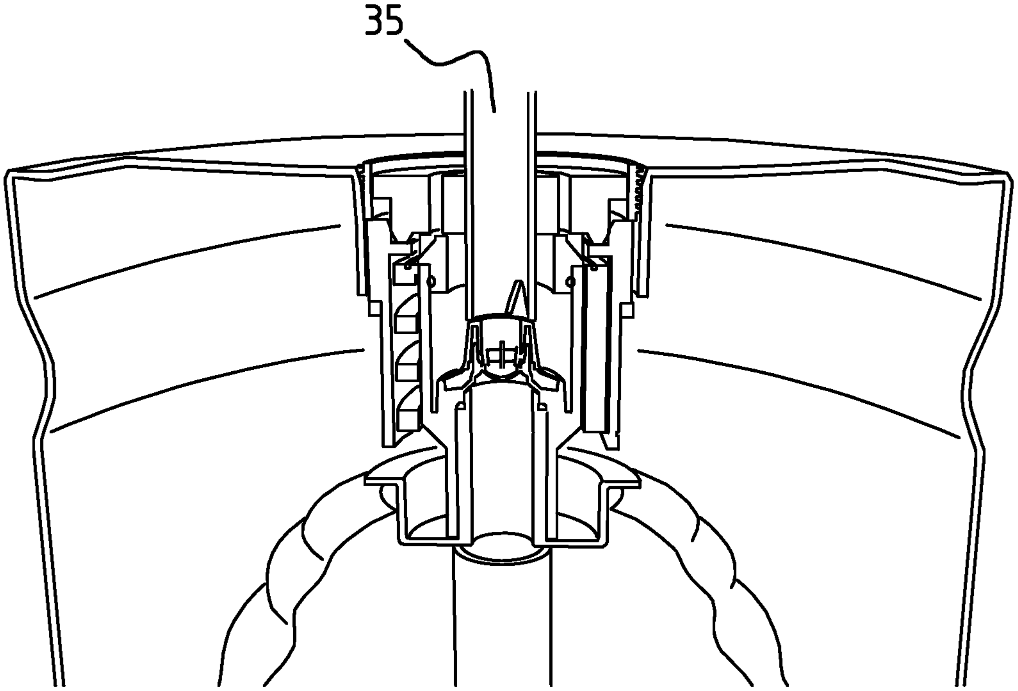
Figure 7B:
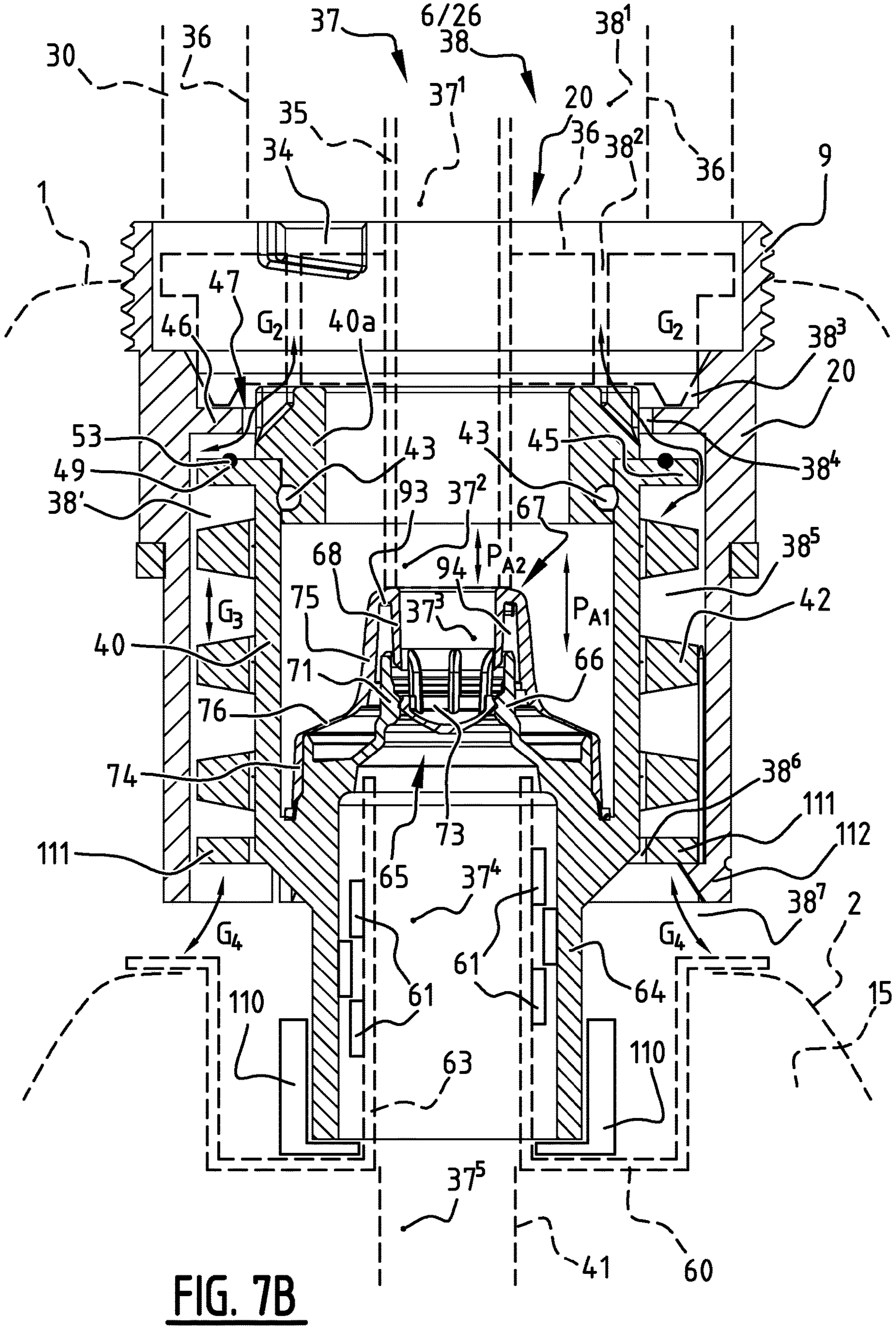
Figure 8:
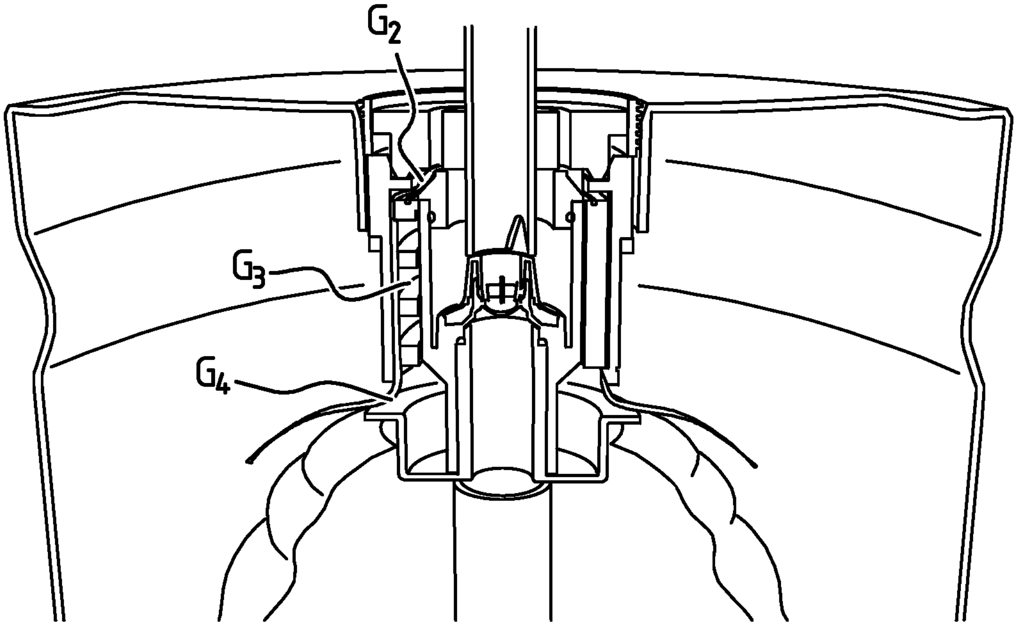

The spring element support of the outer housing 120 has a similar function as spring element support 111 of FIGS. 5B, 7B and 9B. In the embodiment shown in FIGS. 18-26, however, the spring element support is formed by a number of support openings 113 arranged at the bottom side of the outer housing 120, and distributed along the circumference of the housing 120. The support openings 113 are configured to receive, preferably in a snap-fitting manner, a corresponding number of radial projections 151, preferably configured to be flexible, formed along the outer circumference of the spring base 147. In this manner the bottom of the spring element 142 can be easily fixed to the outer housing 140, simply by inserting the inner housing 140 into the outer housing 120 the flexible projections 151 will eventually be forced into the support openings 113 so that the inner housing 140 is properly supported by the outer housing 120.

Figure 21:
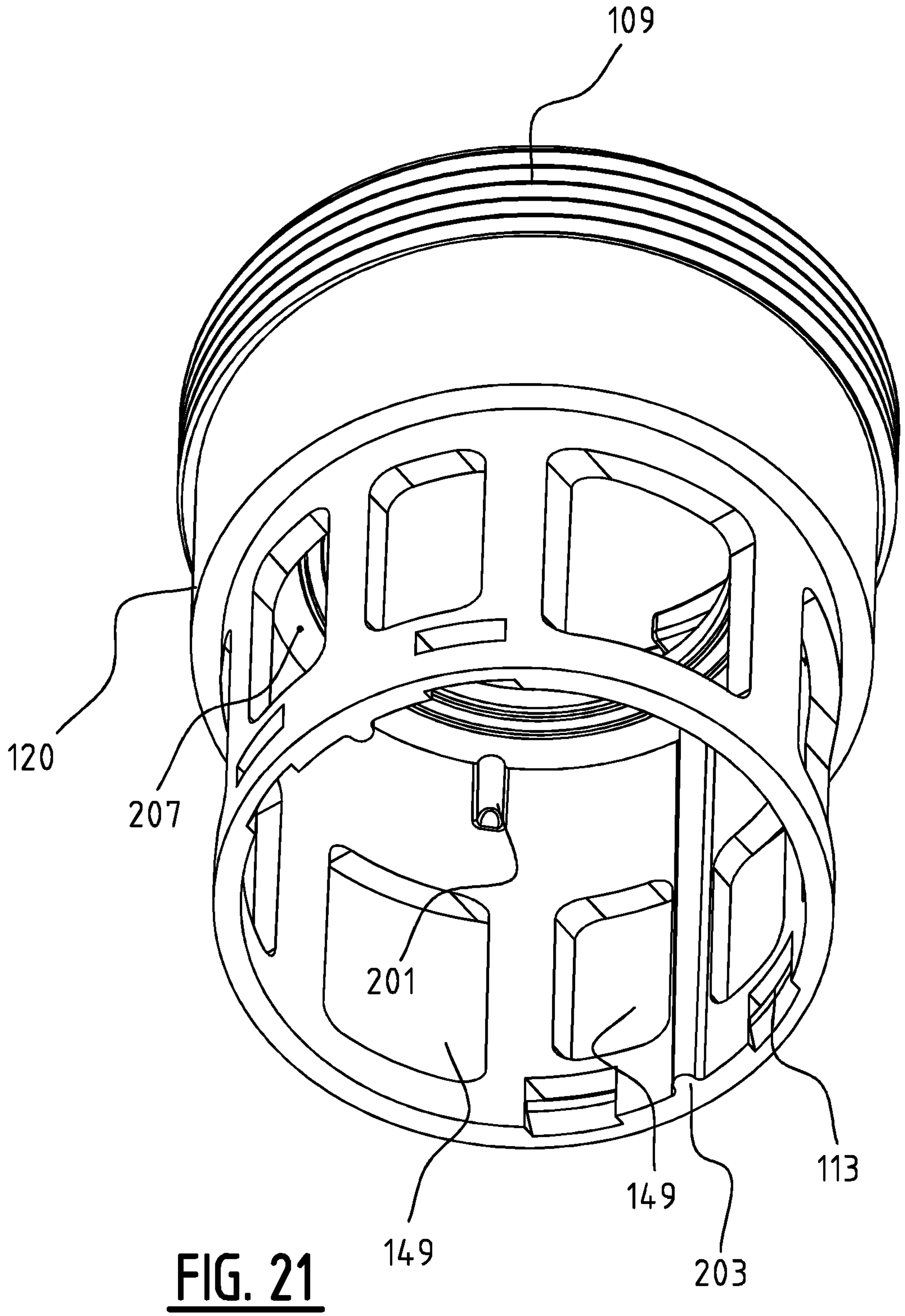
Figure 22:
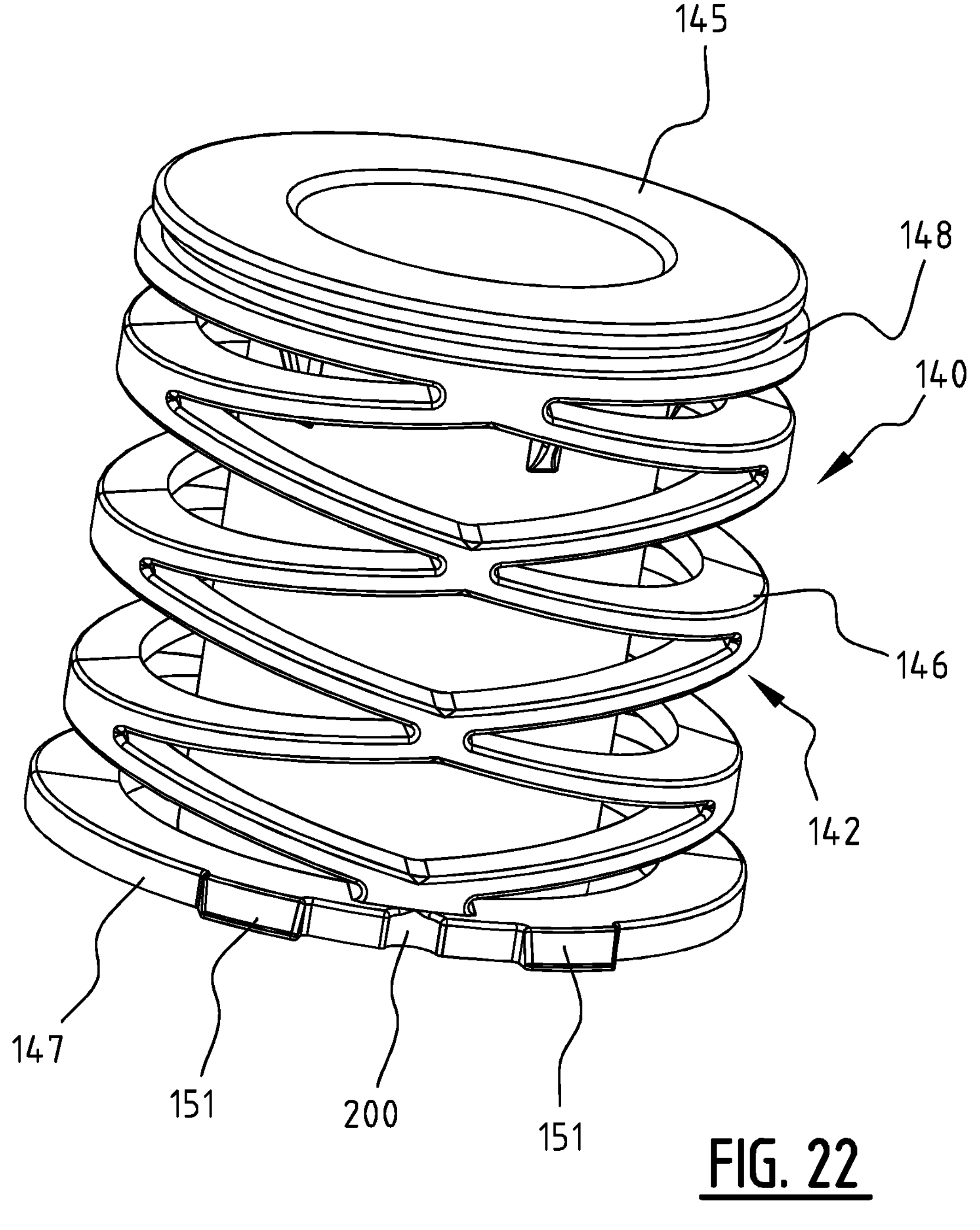
Figure 23:
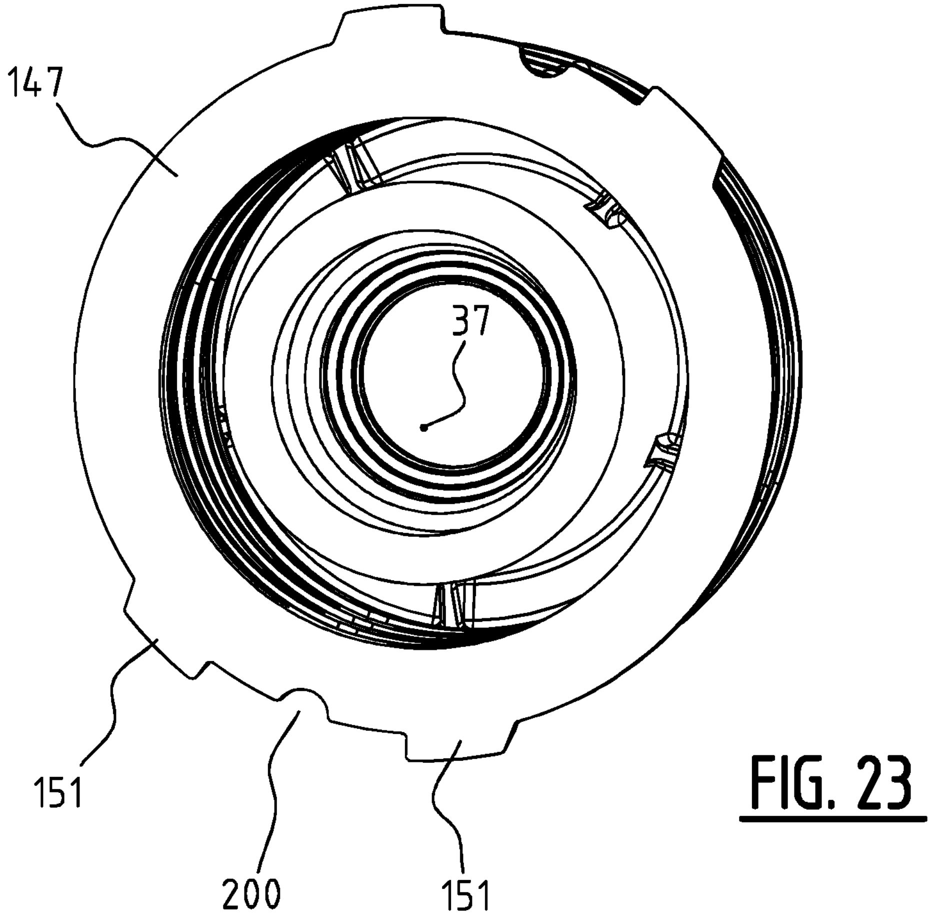
Figure 24:
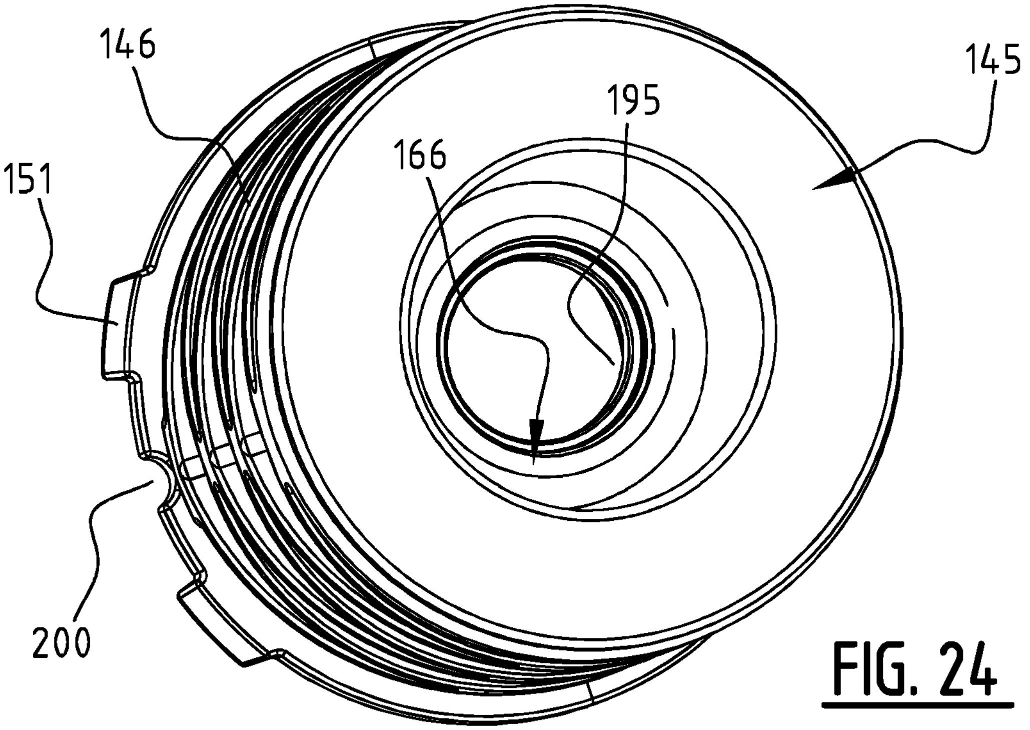

Referring to FIG. 21, the inner surface of the outer housing 120 may additionally be provided with one or more longitudinal mounting orientation ribs 203 extending in a generally axial direction. Similarly, referring to FIG. 22, the inner housing 140 or the spring base 147 of the spring element 142 may be provided with one or more longitudinal recesses 200 for accommodating the mounting orientation ribs 203 when the inner housing 140 is slid into the outer housing 120, in assembly phase of the sealing unit 108. The recesses 200 are arranged at positions corresponding to the position(s) of the one or more mounting orientation ribs 203 so as to be able to allow only one specific orientation in which the inner housing 140 can be inserted into the outer housing 120.

Referring to FIG. 21, a plurality of guidance ribs 201 are provided at the inner surface of the outer housing 120, preferably close to the radial inward flange 207 (which has a similar function as the earlier-mentioned radial flange 46). The guidance ribs 201 may be distributed evenly along the circumference of the inner surface of the outer housing 120 so that the radial flange 145 of the inner housing 140 avoids unwanted movement of the inner housing 140 in radial direction while at the same the inner housing 140 remains freely movable in axial direction.

Figure 25:
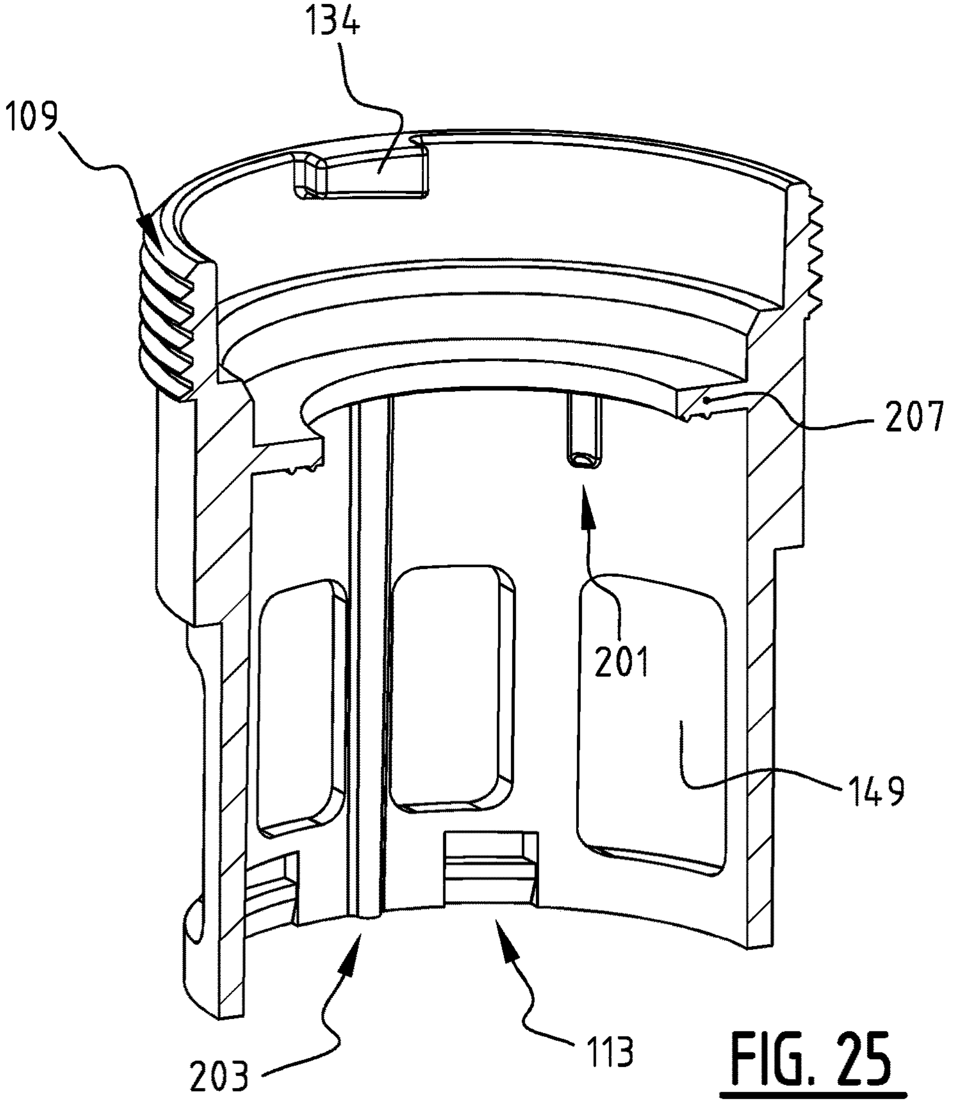
Figure 25A:
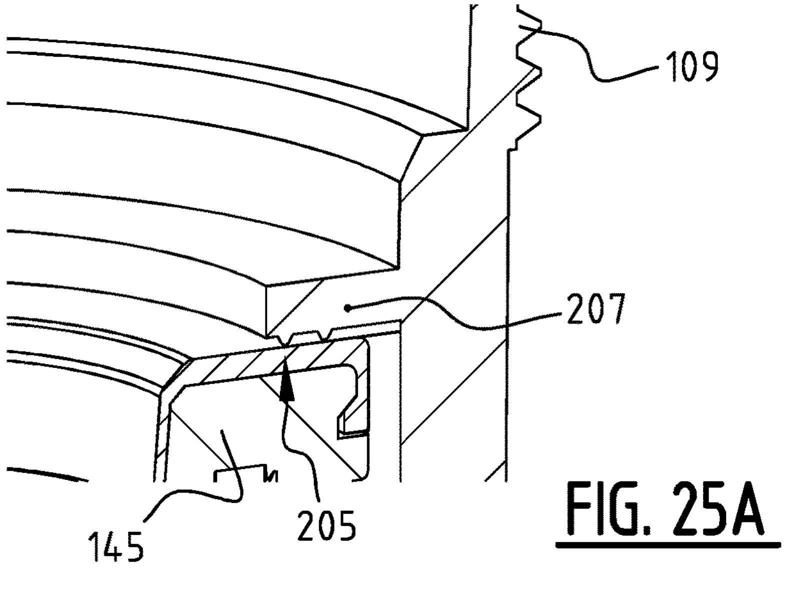

FIG. 25A is a detailed view of the outer housing 120 and a small portion of the inner housing 140 (without the liquid seal unit 165) showing the interspace between the bottom surface of the radial flange 207 of the outer housing 120 and the upper surface of the flange 145 of the inner housing. The figure also shows two generally ring-shaped ribs 205 formed at the bottom surface of the radial flange 207 of the outer housing 120 (this number of ribs 205 may be smaller (i.e. 1) or larger in other embodiments). The ribs 205 are configured to improve the gas sealing capabilities of the sealing unit 108 (of course when the liquid seal unit 165 extends between the upper flange 207 and lower flange 145, for instance as is shown in FIG. 26).

Figure 18:
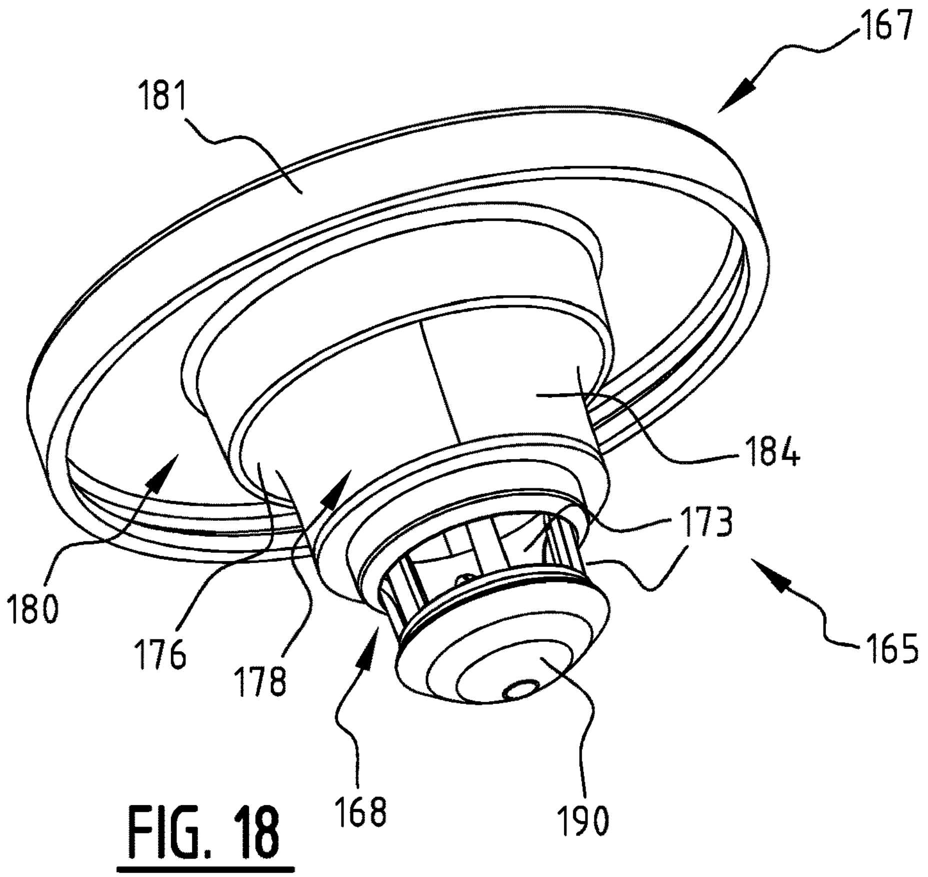
Figure 19:
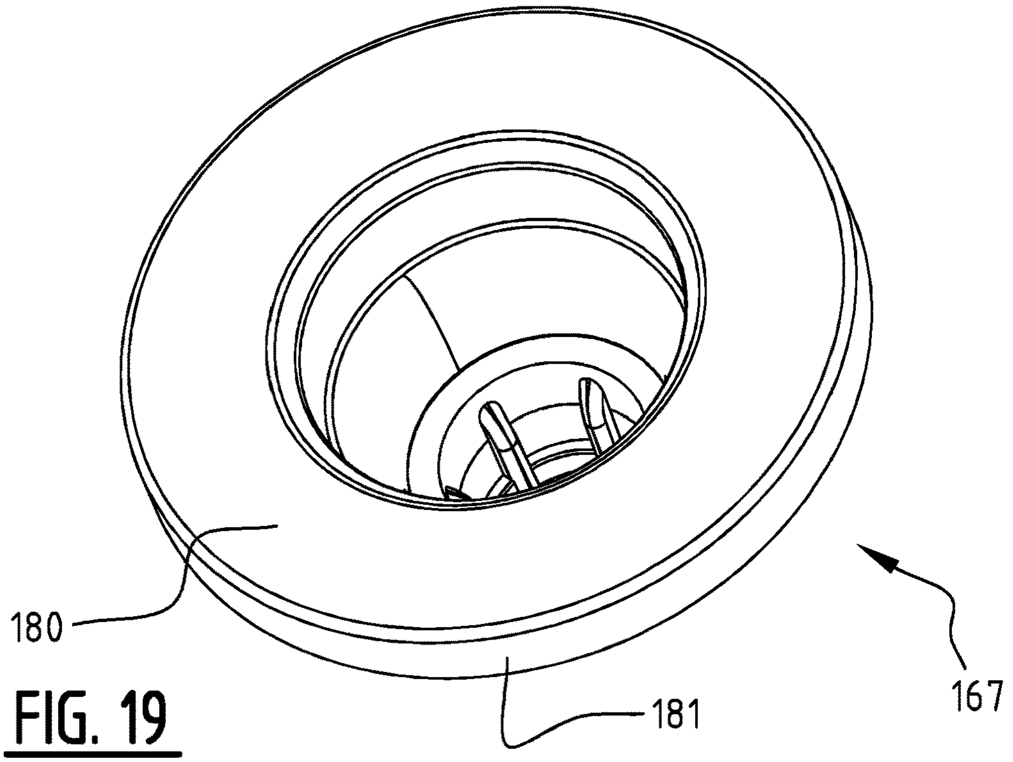
Figure 20:
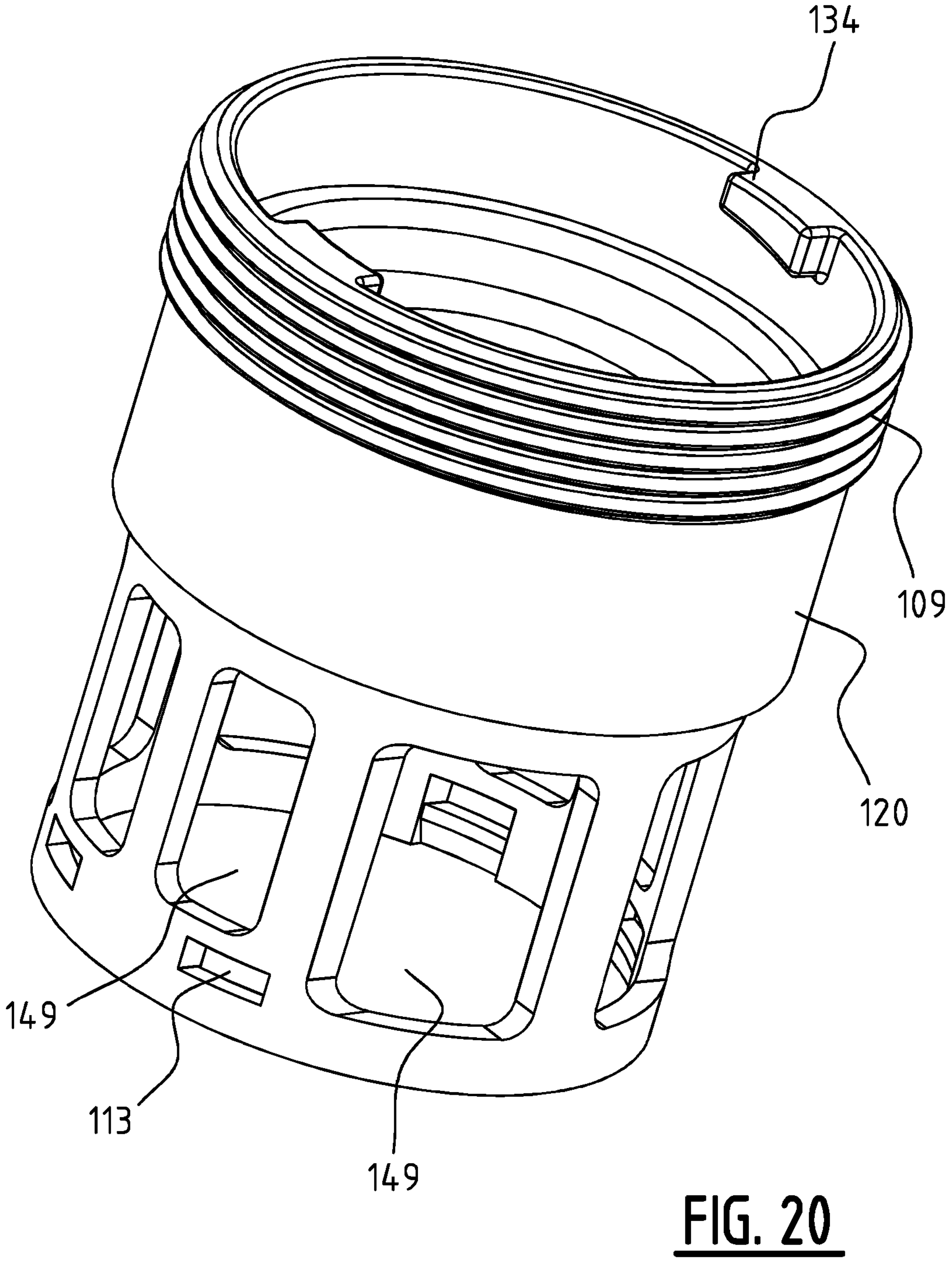

FIG. 26 shows the sealing unit 108 in assembled state, i.e. in a state wherein the inner housing 140 has been inserted into the outer housing 120, while the liquid seal unit 165 is arranged between the outer and inner housing. Referring to FIGS. 18 and 19, the liquid seal unit 165 according to this further (i.e. third) embodiment for a large part corresponds to the earlier-described first embodiment of a liquid seal unit 65 and, even more so, to the second embodiment of a liquid seal unit 65'. Compared to the first embodiment of the liquid seal unit 65, the valve connection element 74 and the flexible connection element 76 of the first embodiment have been replaced in the third embodiment by a valve connection element 178 and a flexible connection element 176, respectively. Furthermore, while in the first and second embodiment the base is formed by a separate tubular base element 71 provided with an elastic ring-shaped seal collar 95 extending inwardly towards the tubular valve element 68, in the third embodiment the base is formed by an appropriately shaped part of the inner housing 140. In other words, the tubular base element 171 is a part of the wall of the inner housing 140. The liquid passage in the inner housing 140 has a locally narrowing shape forming the base of the liquid seal unit 165. The wall of the inner housing 140 comprises a tubular base element 171 (cf. FIG. 26), the tubular base element 171 comprising an elastic ring-shaped seal collar 195 extending inwardly towards the tubular valve element 168. The tubular base element 171 integrally formed with the wall of the inner housing 140 has the same function as the earlier described tubular base elements 71, 71'. Although in the third embodiment the tubular base element 171 is integrally formed with the wall of the inner housing, in other embodiments (not shown) the tubular base element may also be formed by a separate component that can be attached to the wall of the inner housing 140. Important is that the tubular base element is able to function as a seat for the axially movable tubular valve element of the valve and to block the liquid openings in the tubular valve element when this is in a first axial position and to leave these liquid openings open when the tubular valve element is in a second position.

For the remaining part the third embodiment may correspond to the first and second embodiment.

The flexible connection element 176 may be configured (for instance made flexible enough) to function as a further biasing element: it allows the valve to be moved from the closed state to the open state (i.e. moved downward in the shown arrangement) when an external force is exerted on top of the valve, while it will automatically bring the valve back from the open state to the closed state in absence of an external force on the valve.

The liquid seal unit 165 of the third embodiment is attached to and/or formed with the inner housing 40 of the sealing unit 108 in a manner similar to the liquid seal unit 65' of the second embodiment. The liquid seal unit 165 comprises a base 166 and a valve 167. The base 166 in this embodiment is formed by the local narrowing shape of wall of the wall of the inner housing 140 (see FIGS. 24 and 26). The valve 167 of the liquid seal unit 165 comprises a valve connection element 178 that has a portion 184 of a generally tapering shape (in the downward axial direction), more specifically the shape of a truncated cone. The function of this portion 184 of the connection element 178 will become apparent from the description of the operation of the sealing unit in FIGS. 27A-27C.

The valve connection element 178 is configured to connect the valve to the inner housing 140 and has to this end a sealing extension 180 extending onto the radial flange 145 of the inner housing 140. The sealing extension 180 is made of flexible material and is shaped (with a circumferential skirt 181) to allow the valve to be fixed to, preferably snapped onto, the radial flange 145 of the inner housing 140 while at the same time allowing for a good seal between the radial flange 145 of the inner housing 140 and the radial flange 207 of the outer housing 20, at least when the inner and outer housings are in the first (initial) position (cf. FIG. 27A). In this position the gas passage is completely sealed off and no gas may flow into and out of the container 1. Since the sealing extension 180 of the valve is made of flexible material, good sealing characteristics can be achieved without the use of any additional sealing means, such as the O-shaped seals rings 69 present in the second embodiment (cf. FIGS. 13A-13C and 14).

Figures 27A, 27B, 27C:
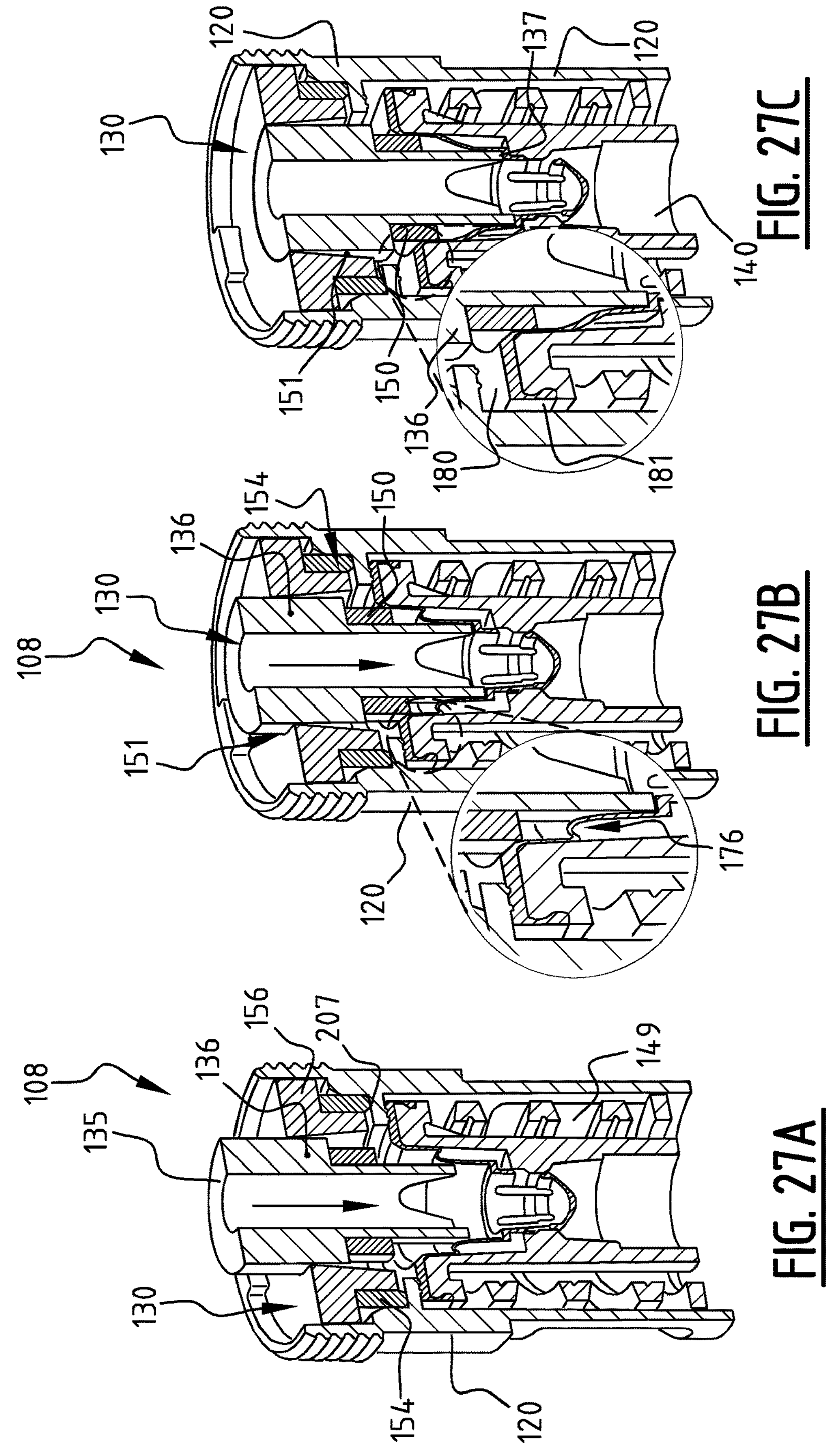

Next is described the manner in which the gas seal and liquid seal are activated, i.e. moved from their respective closed positions to the open positions. FIG. 27A shows the sealing unit 165 in which a control unit 130 has been inserted. The control unit 130 corresponds for a large part to the control unit 30 and a detailed description will be left out here. The control unit 130 comprises a tube 135 (similar to the inner tube 35 of the first and second embodiments) and an outer element 136 surrounding the tube 135 and leaving between the tube 135 and outer element 136 a ring-shaped interspace 151 forming the gas passage $\mathbf{38}^2$ to towards and from the sealing unit 108. As can be seen in the figures, the outer element 136 may be considered to be a generally tubular outer element or an outer tube, similar to the outer tube 36 of the first and second embodiments.

At the bottom side of the outer element 136 a ring-shaped support member 154 is arranged so as to allow the outer element 136 to be inserted into the sealing unit 108 and then properly be supported on the radial flange 207 of the outer housing 120. The (inner) tube 135 is arranged to be movable in axial direction (see arrows in FIGS. 27A and 27B) once the outer element 136 is inserted into the sealing unit and supported on the radial flange 207. The tube 135 has a widened portion 156 (wherein the thickness of the wall is larger). At the bottom side of the widened portion 156 a ring-shaped end element 150 is formed or attached.

In the position shown in FIG. 27A, both the gas seal and the liquid seal are closed. As to the gas seal, the gas passage is blocked since the inner housing 140 is forced by the spring element in the most upright position so that the flange 145 of the inner housing 140 pushes against the sealing extension 180 sandwiched between flange 145 and the corresponding flange 207 of the outer housing 120. As to the liquid seal, in the uppermost position of the inner housing 140 the liquid openings 173 in the tubular valve element 168 portion of the valve is closed by the sealing body, preferably a sealing body formed by an elastic ring-shaped seal collar 195 of the tubular base element 171 extending inwardly towards the tubular valve element 168.

When the tube 135 is moved downward in axial direction, from the initial, first position of FIG. 27A to the second position shown in FIG. 27B, the bottom side of the ring-shaped end element 150 starts pushing downward on the conical part 184 of the valve connection element 178 so as to ensure a correct sealing of the contact area between the tube 135 and the liquid seal unit 165, i.e. to provide a liquid-tight or even a gas-tight sealing (even before the liquid seal in opened in a further stage). During the movement from the initial position to the second position, not only the ring-shaped end element 150 at the bottom side of the widened portion 136 of the tube 135 is pushed against the conical part 184 of the connection element 178, but also the bottom end of the (cylindrical wall of the) tube 135 contacts the step-shaped flexible portion 176 and starts pushing the tubular valve element 168 downward so that the tubular valve element 168 of the valve to start moving downward to reach the opened position shown in FIG. 27C. In the latter position the liquid openings 173 in the tubular valve element 168 that were previously closed off by the presence of the elastic ring-shaped seal collar 195 of the inner housing 140, are now exposed. In this manner the liquid passage 37 becomes unblocked so that liquid can now flow freely through these openings 173.

It is noted that liquid cannot leave the liquid passage in the area of the contact surface between the bottom end 137 of the tube 135 and the step-shaped flexible portion 176 of the valve and because of the seal formed between the (ring-shaped end element 150 of the) tube 135 and the conical part 184 of the valve connection element 178. Similarly, gas can flow in the gas flow passage 38 without the risk of passing the same seal.

It is to be understood that this invention is not limited to particular aspects described, and, as such, may vary. It is also to be understood that the terminology used herein is for the purpose of describing particular aspects only, and is not intended to be limiting, since the scope of the present invention will be limited only by the appended claims.

The invention claimed is:

1. A sealing unit for sealing an opening in a wall of a container for storing, transporting, and serving a liquid, the sealing unit comprising:

- an outer housing configured to be fixedly attached to a container wall;
- an inner housing arranged inside the outer housing and configured to be axially movable relative to the outer housing, wherein:
  - the outer and inner housing are configured to define a gas flow passage arranged between an outer surface of the inner housing and an inner surface of the outer housing,
  - the inner housing is movable in first axial directions between a first axial position wherein the gas flow passage is closed and gas is prevented from flowing into the container or out of the container and a second axial position wherein the gas flow passage is open and gas is allowed to flow in second axial directions into the container or out of the container;
- a biasing element arranged between the outer housing and inner housing and configured to urge the movable inner housing to move to the first axial position, wherein:
  - a liquid flow passage is defined inside the movable inner housing,
  - a liquid seal unit is arranged in the liquid flow passage, the liquid seal unit comprises:
    - a base fixedly attached to or integrally formed with the movable inner housing and including a tubular base element, and
    - a valve including a tubular valve element arranged to be axially movable inside the tubular base element,
  - the tubular valve element is configured to be movable inside the tubular base element between a closed position wherein the liquid flow passage is closed and liquid is prevented from flowing into or out of the container, and an open position wherein the liquid flow passage is open and liquid is allowed to flow in third axial directions into the container or out of the container,
  - the valve further includes a valve connection element for attaching the valve fixedly to the inner housing, and still further includes an axially movable tubular valve member connected to or formed with the axially movable tubular valve element, and a flexible connection element made of flexible material and formed between the axially movable tubular valve member and the valve connection element, and
  - the valve connection element being stationary with respect to the inner housing and the flexible connection element forming a further biasing element configured to urge the axially movable tubular valve element to move to the closed position.

2. The sealing unit as claimed in claim 1, wherein the biasing element is configured to allow the inner housing to be moved from the first axial position to the second axial position under an influence of a first external force while forcing the inner housing to move from the second axial position to the first axial position when the first external force is reduced or removed.

3. The sealing unit as claimed in claim 1, wherein both the outer housing and inner housing are at least one of cylindrically shaped, concentrically arranged and together forming a telescopic tube.

4. The sealing unit as claimed in claim 1, wherein at least one of the outer housing, the inner housing and the liquid seal unit are made of plastic.

5. The sealing unit as claimed in claim 4, wherein the base of the liquid seal unit is at least partially made of plastic material having a larger flexibility than the other parts of the liquid seal unit.

6. The sealing unit as claimed in claim 1, wherein the sealing unit is configured to allow axial movement of the valve of the liquid seal unit relative to the inner housing independently from the axial movement of the inner housing relative to the outer housing.

7. The sealing unit as claimed in claim 1, wherein an interspace between the outer and inner housing defining the gas flow passage has an annular shape and/or wherein the liquid flow passage has a generally cylindrical shape.

8. The sealing unit as claimed in claim 1, wherein the valve connection element includes a sealing extension extending onto a radial flange of the inner housing for forming a seal between the radial flange of the inner housing and a corresponding radial flange of the outer housing.

9. The sealing unit as claimed claim 1, wherein a portion of the valve connection element has a tapering shape.

10. The sealing unit as claimed in claim 1, wherein;

- the inner surface of the outer housing has at least one longitudinal mounting orientation rib extending in a fourth axial direction, and
- an outer surface of the inner housing has at least a longitudinal recesses for accommodating the at least one mounting orientation rib when the inner housing is slid into the outer housing.

11. The sealing unit as claimed in claim 1, wherein the inner housing comprises a tubular end part configured to receive a bag connection element for attaching a collapsible bag inside the container.

12. A bag connection element configured to connect a collapsible bag to the sealing unit as claimed in claim 1, the bag connection element comprising:

a tubular upper portion configured for insertion that can be inserted into a tubular end part of the inner housing of the sealing unit, wherein;

the tubular upper portion comprises attachment elements configured for attachment to an inner surface of the tubular end part, and/or an outer surface of the tubular upper portion-preferably comprises radial protrusions, for instance a number of parallel ring shaped ribs, allowing the bag connection element to be snap-fitted to radial protrusions provided at the inner surface of the tubular end part of the inner housing of the sealing unit.

13. The bag connection element according to claim 11, further comprising:

one or more support elements each defining a receiving space configured to receive the tubular end part of the inner housing when the bag connection element is inserted into the tubular end part.

14. The bag connection element as claimed in claim 12, wherein;

a receiving space has a width corresponding to a thickness of the tubular end part of the inner housing, and/or the bag connection element is a plastic spout comprising a radial attachment flange connected to a pouch forming the collapsible bag.

15. A control unit for controlling a gas flow and a liquid flow into or out of a container for storing, transporting, and serving a liquid, the control unit being configured to be coupled in a removable manner to the sealing unit as claimed in claim 1, the control unit comprising:

a control unit housing comprising a coupling fitting for removably coupling the control unit housing to a corresponding coupling fitting of the sealing unit.

16. The control unit as claimed in claim 15, wherein:

the control unit housing includes a number of passages configured to pass a driving gas and liquid, and/or the control unit housing comprises a first inner tube having a first diameter and a second outer tube, arranged concentrically around the first inner tube and having a second diameter larger than the first diameter, the first inner tube and outer tube are configured to move telescopically relative to each other to exert an external axial force on the inner housing and valve when the control unit is mounted to the sealing unit.

17. The control unit as claimed in claim 15, wherein:

the container and/or the control unit is made of steel or aluminum, and/or the container is generally cylindrical.

18. An assembly comprising a container for storing, transporting, and serving a liquid, the container comprising a wall having an opening in which the sealing unit as claimed in claim 1, is mounted, the container comprising a collapsible, thin-walled liquid bag made of flexible material arranged in an interior of the container, wherein the collapsible bag is configured to allow a beverage to be arranged in its interior while in an interspace between the walls of the container and the collapsible bag a driving gas can be arranged.

19. The assembly as claimed in claim 17, wherein the container is a beer keg.

20. A method of operating the sealing unit as claimed in claim 1, the method comprising:

exerting a first external axial force on the inner housing so as to move the inner housing from the first axial position to the second axial position;

supplying gas through the gas flow passage into the container, or removing gas from the container through the gas flow passage;

exerting a second external force on the tubular valve element so as to move the tubular valve element from the closed position to the open position;

supplying liquid through the liquid flow passage into the container, or removing liquid from the container through the liquid flow passage; and reducing or removing the first external axial force on the inner housing and the second external force on the tubular valve element thereby causing the inner housing and the tubular valve element to move the inner housing to the first axial position and the tubular valve element to the closed position.

21. The method according to claim 20, wherein:

supplying gas through the gas flow passage into the container includes supplying the gas into an interspace between the container wall and a collapsible bag arranged inside the container, and/or supplying liquid through the liquid flow passage into the container includes supplying the liquid into an interior of the collapsible bag arranged inside the container.

22. The sealing unit according to claim 1, wherein the flexible connection element is made of an elastic material.

* * * * *